US012657787B2

(12) United States Patent
Jiang et al.

(10) Patent No.: US 12,657,787 B2
(45) Date of Patent: Jun. 16, 2026

(54) HAIR COLOR SIMULATION USING A HAIR COLOR CLASSIFICATION GUIDED NETWORK

(71) Applicant: L'Oreal, Paris (FR)

(72) Inventors: Ruowei Jiang, Mississauga (CA); Zhi Yu, Toronto (CA); Sidharth Singla, Etobicoke (CA); Kin Ching Lydia Chau, Toronto (CA)

(73) Assignee: L'Oreal, Paris (FR)

( * ) Notice: Subject to any disclaimer, the term of this patent is extended or adjusted under 35 U.S.C. 154(b) by 126 days.

(21) Appl. No.: 18/532,834

(22) Filed: Dec. 7, 2023

(65) Prior Publication Data

US 2025/0191248 A1     Jun. 12, 2025

(51) Int. Cl.
| | |
|---|---|
| *G06T 11/00* | (2006.01) |
| *G06Q 30/0601* | (2023.01) |
| *G06T 11/10* | (2026.01) |
| *G06T 11/60* | (2006.01) |
| *G06V 10/56* | (2022.01) |
| *G06V 10/764* | (2022.01) |
| *G06V 10/77* | (2022.01) |
| *G06V 10/774* | (2022.01) |
| *G06V 10/82* | (2022.01) |

(52) U.S. Cl.
CPC .......... *G06T 11/10* (2026.01); *G06Q 30/0643* (2013.01); *G06T 11/60* (2013.01); *G06V 10/56* (2022.01); *G06V 10/764* (2022.01); *G06V 10/7715* (2022.01); *G06V 10/774* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 6,381,346 B1 * | 4/2002 | Eraslan | .................. | G06T 17/20 |
| | | | | 382/199 |
| 6,453,052 B1 * | 9/2002 | Kurokawa | ................ | G06T 7/33 |
| | | | | 30/30 |

(Continued)

FOREIGN PATENT DOCUMENTS

| | | |
|---|---|---|
| EP | 3627444 A1 | 3/2020 |
| EP | 4083937 A1 | 11/2022 |

OTHER PUBLICATIONS

Berthelot, D., et al., "Remixmatch: Semi-Supervised Learning With Distribution Alignment and Augmentation Anchoring," arXiv:1911. 09785v2 [cs.LG], Feb. 2020, 13 pages.

(Continued)

*Primary Examiner* — Martin Mushambo
(74) *Attorney, Agent, or Firm* — Christensen O'Connor Johnson Kindness PLLC

(57) ABSTRACT
Aspects of hair simulation, and networks therefor are provided including aspects to train such networks. There is provided a generative model for hair simulation that is guided during training by a hair classifier model. The generative model in an embodiment is provided for use in a virtual try-on (VTO) pipeline such as for virtually trying on hair color products. Further provided is a color mapping network to process an input image and target hair color for the generative model to define the hair simulation (e.g. as an output image with simulated hair color).

17 Claims, 10 Drawing Sheets

(56) References Cited

U.S. PATENT DOCUMENTS

| | | | | |
|---|---|---|---|---|
| 7,418,371 | B2* | 8/2008 | Choe | G06T 11/00 |
| | | | | 703/2 |
| 8,055,011 | B2* | 11/2011 | Ikeda | G06T 11/00 |
| | | | | 382/100 |
| 8,249,365 | B1* | 8/2012 | Winnemoeller | G06F 3/0484 |
| | | | | 382/181 |
| 8,797,323 | B2* | 8/2014 | Salvi | G06T 15/60 |
| | | | | 345/426 |
| 8,884,980 | B2* | 11/2014 | Mallick | G06V 40/162 |
| | | | | 345/593 |
| 9,058,765 | B1* | 6/2015 | Mallick | G06Q 30/0256 |
| 9,367,940 | B2* | 6/2016 | Weng | G06V 40/171 |
| 9,905,045 | B1* | 2/2018 | Hery | G06T 15/06 |
| 9,928,601 | B2* | 3/2018 | Aarabi | H04N 1/628 |
| 10,217,244 | B2* | 2/2019 | Kowalczyk | H04N 1/6027 |
| 10,825,219 | B2* | 11/2020 | Fu | G06V 40/16 |
| 10,849,408 | B2* | 12/2020 | Skwarek | G06Q 30/0643 |
| 11,093,733 | B2* | 8/2021 | Yuan | G06V 40/167 |
| 2006/0224366 | A1* | 10/2006 | Choe | G06T 11/00 |
| | | | | 703/2 |
| 2009/0232409 | A1* | 9/2009 | Marchesotti | G06T 7/0002 |
| | | | | 382/254 |
| 2011/0063291 | A1* | 3/2011 | Yuksel | G06T 17/20 |
| | | | | 345/420 |
| 2011/0304623 | A1* | 12/2011 | Tamstorf | G06T 15/506 |
| | | | | 345/426 |
| 2012/0075331 | A1* | 3/2012 | Mallick | G06V 40/162 |
| | | | | 345/594 |
| 2013/0215139 | A1* | 8/2013 | Xie | G06T 15/50 |
| | | | | 345/595 |
| 2013/0280688 | A1* | 10/2013 | Pagana-Lausch | G09B 23/00 |
| | | | | 434/270 |
| 2016/0154993 | A1* | 6/2016 | Aarabi | G06T 7/90 |
| | | | | 382/118 |
| 2016/0335987 | A1* | 11/2016 | Mazzola | G09G 5/397 |
| 2017/0206678 | A1* | 7/2017 | Kowalczyk | H04N 1/6027 |
| 2018/0039745 | A1* | 2/2018 | Chevalier | G16H 50/20 |
| 2018/0374242 | A1* | 12/2018 | Li | G06T 15/04 |
| 2019/0035163 | A1* | 1/2019 | Skwarek | G06V 40/165 |
| 2019/0059560 | A1* | 2/2019 | Miklatzky | A45D 19/012 |
| 2020/0196936 | A1* | 6/2020 | Blank | G09B 19/00 |
| 2020/0219328 | A1* | 7/2020 | Yau | G06T 7/90 |
| 2020/0320748 | A1* | 10/2020 | Levinshtein | G06V 10/454 |
| 2020/0334868 | A1* | 10/2020 | Zilly Claude | A45D 44/005 |
| 2020/0336705 | A1* | 10/2020 | Mouizina | G09G 5/10 |
| 2021/0074076 | A1* | 3/2021 | Powers | G06T 7/344 |
| 2021/0142539 | A1* | 5/2021 | Ayush | G06N 3/08 |
| 2021/0264576 | A1* | 8/2021 | Sun | G06T 5/94 |
| 2021/0406589 | A1* | 12/2021 | Yadav | G06T 7/11 |
| 2021/0406996 | A1* | 12/2021 | Yu | G06V 10/764 |
| 2021/0407216 | A1* | 12/2021 | Peng | G06V 40/171 |
| 2022/0005189 | A1* | 1/2022 | Perrot | G06T 7/0012 |
| 2022/0012901 | A1 | 1/2022 | Sun et al. | |
| 2022/0084226 | A1* | 3/2022 | Uludag | G06T 11/40 |
| 2022/0101577 | A1* | 3/2022 | Chakrabarty | G06T 7/11 |
| 2022/0164852 | A1* | 5/2022 | Punyani | G06V 10/82 |
| 2022/0198830 | A1* | 6/2022 | Li | G06T 11/00 |
| 2022/0211593 | A1* | 7/2022 | Bowker | A61K 8/042 |
| 2022/0366607 | A1* | 11/2022 | Bojan | G06V 10/763 |
| 2022/0392025 | A1* | 12/2022 | Mironica | G06T 5/50 |
| 2024/0177360 | A1* | 5/2024 | Hong | G06F 3/0482 |
| 2025/0157181 | A1 | 5/2025 | Wilson et al. | |

OTHER PUBLICATIONS

Berthelot, D., et al., "MixMatch: A Holistic Approach to Semi-Supervised Learning," arXiv:1905.02249v2 [cs.LG], Oct. 2019, 14 pages.

Chapelle, O., et al. (eds.) "Semi-Supervised Learning," The MIT Press, Cambridge, MA, 2006, 524 pages.

Guan, M.Y., et al., "Who Said What: Modeling Individual Labelers Improves Classification," Proceedings of the AAAI Conference on Artificial Intelligence 32(1):3109-3118, Apr. 2018.

Hendrycks, D. , "Using Trusted Data to Train Deep Networks on Labels Corrupted by Severe Noise," Advances in Neural Information Processing Systems, Feb. 2018, 17 pages.

Laine, S., and T. Aila, "Temporal Ensembling for Semi-Supervised Learning," Conference Paper at ICLR 2017, arXiv:1610.02242v3 [cs.NE], Mar. 2017, 13 pages.

Lee, K.-H., et al., "CleanNet: Transfer Learning for Scalable Image Classifier Training with Label Noise," 2018 IEEE/CVF Conference on Computer Vision and Pattern Recognition, Mar. 2018, 10 pages.

Lee, D.-H., "Pseudo-Label : The Simple and Efficient Semi-Supervised Learning Method for Deep Neural Networks," Workshop on Challenges in Representation Learning, ICML, vol. 3, No. 2, Jul. 2013, 7 pages.

Li, W., et al., "WebVision Database: Visual Learning and Understanding fromWeb Data," arXiv: 1708.02862v1, Aug. 2017, 9 pages.

Liu, T., and D. Tao, "Classification with Noisy Labels by Importance Reweighting," IEEE Transactions on Pattern Analysis and Machine Intelligence, Jul. 2015, 19 pages.

Liu, Z., et al., "Deep Learning Face Attributes in the Wild," Proceedings of the International Conference on Computer Vision (ICCV), Sep. 2015, 11 pages.

Loschchilov, I., and F. Hutter, "SGDR: Stochastic Gradient Descent With Warm Restarts," conference paper, arXiv:1608.03983v5, May 2018, 16 pages.

Patrini, G., et al., "Making Deep Neural Networks Robust to Label Noise: a Loss Correction Approach," 2017 IEEE Conference on Computer Vision and Pattern Recognition (CVPR), Mar. 2017, 9 pages.

Rasmus, A., et al., "Semi-Supervised Learning with Ladder Networks," Proceedings of the 29th International Conference on Neural Information Processing Systems—vol. 2 , Nov. 2015, 19 pages.

Sohn, Kihyuk, et al. "Fixmatch: Simplifying semi-supervised learning with consistency and confidence." 34th Conference on Neural Information Processing Systems (NeurIPS 2020), Advances in Neural Information Processing Systems 33 (2020): 596-608.

Song, H.. , et al, :SELFIE: Refurbishing Unclean Samples for Robust Deep Learning, Proceedings of the 36th International Conference on Machine Learning, PMLR 97:5907-5915, Long Beach, CA, c. 2019.

Surowiecki, J., "The Wisdom of Crowds," Introduction and 1st Chapter, Doubleday, New York, Jun. 2004, 18 pages.

Tanno, R., et al., "Learning From Noisy Labels By Regularized Estimation Of Annotator Confusion," arXiv:1902.03680v3, Jun. 2019, 15 pages.

Tarvainen, A, and H. Valpola, "Mean teachers are better role models: Weight-averaged consistency targets improve semi-supervised deep learning results," arXiv:1703.01780v6, Apr. 2018, 16 pages.

Xiao, T., et al., "Learning from Massive Noisy Labeled Data for Image Classification," 2015 IEEE Conference on Computer Vision and Pattern Recognition (CVPR), Boston, MA, Jun. 7-12, 2015, pp. 2691-2699.

Xie, Q., "Unsupervised Data Augmentation," 34th Conference on Neural Information Processing Systems (NeurIPS 2020), Vancouver, Canada, arXiv:1904.12848v6, Nov. 2020, 20 pages.

Zhu, X., and A. Goldberg, "Introduction to Semi-Supervised Learning", c. Springer Nature Switzerland AG, 2009, pp. 1-12.

International Search Report and Written Opinion of the International Searching Authority mailed on Apr. 8, 2025, issued in PCT Application No. PCT/EP2024/084949; 20 pages.

Borza, D. et al., "A Deep Learning Approach to Hair Segmentation and Color Extraction from Facial Images," ACIVS 2018, LNCS 1182, pp. 438-449.

Neat, Catherine, "How to Decode the Hair Color Numbering System?" <https://www.glc1mot.com/blog/26433/how-to-decode-the-hoir-color-nurnbering-system>, Apr. 7, 2017 (Year: 2021), 5 pages.

Ponlawan, P., et al., "Guideline of Personalized Facial Makeup Using a Hierarchical Cascade Classifier," 202118th International

(56)        References Cited

OTHER PUBLICATIONS

Joint Conference on Computer Science and Software Engineering
(JCSSE), Lampang, Thailand, Jun. 30, 2021-Jul. 2, 2021, 6 pages.

* cited by examiner

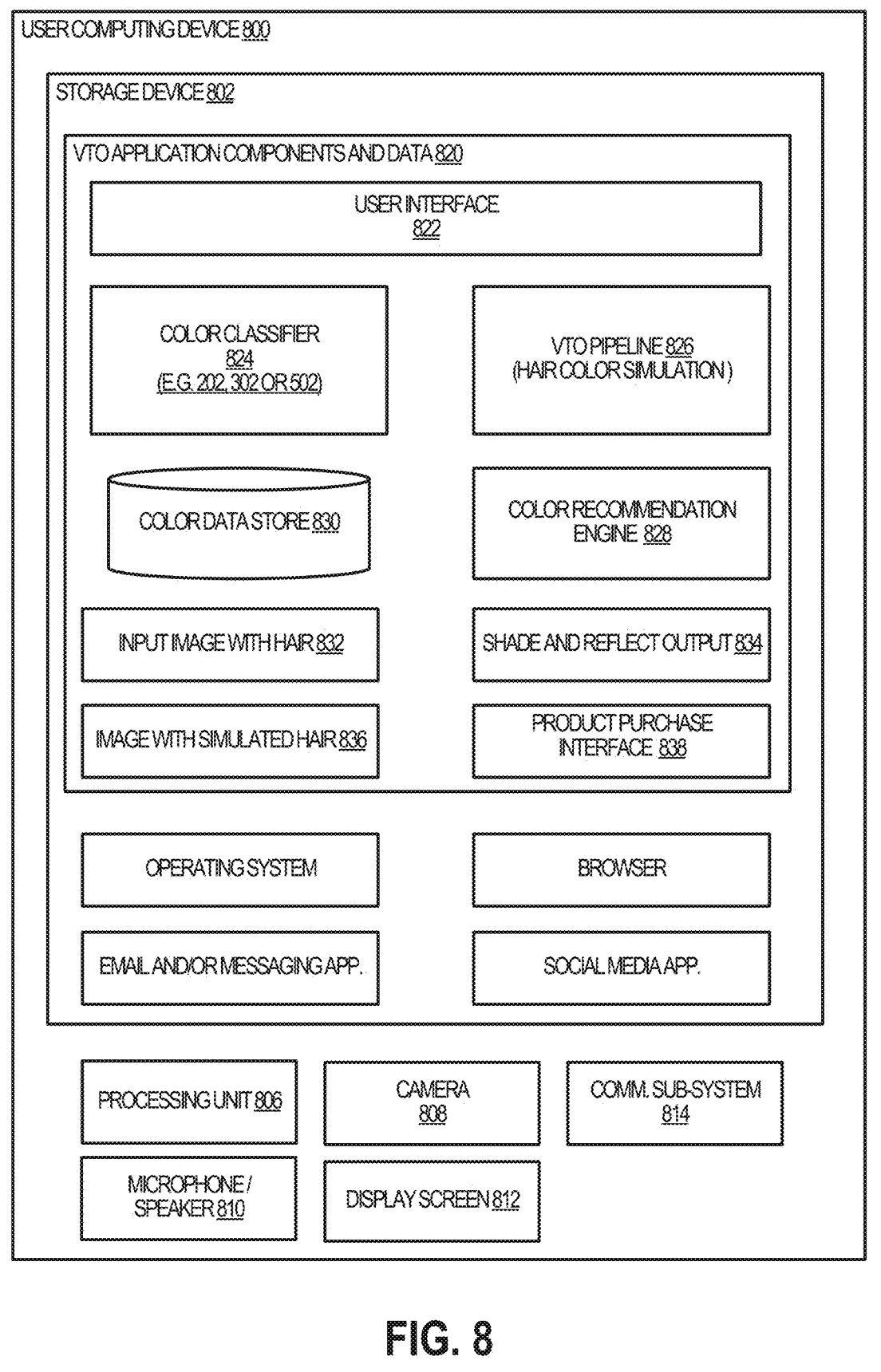

USER COMPUTING DEVICE 800

STORAGE DEVICE 802

VTO APPLICATION COMPONENTS AND DATA 820

USER INTERFACE
822

COLOR CLASSIFIER
824
(E.G. 202, 302 OR 502)

VTO PIPELINE 826
(HAIR COLOR SIMULATION)

COLOR DATA STORE 830

COLOR RECOMMENDATION
ENGINE 828

INPUT IMAGE WITH HAIR 832

SHADE AND REFLECT OUTPUT 834

IMAGE WITH SIMULATED HAIR 836

PRODUCT PURCHASE
INTERFACE 838

OPERATING SYSTEM

BROWSER

EMAIL AND/OR MESSAGING APP.

SOCIAL MEDIA APP.

PROCESSING UNIT 806

CAMERA
808

COMM. SUB-SYSTEM
814

MICROPHONE /
SPEAKER 810

DISPLAY SCREEN 812

FIG. 8

HAIR COLOR SIMULATION USING A HAIR COLOR CLASSIFICATION GUIDED NETWORK

FIELD OF INVENTION

The present disclosure relates to computer image processing and artificial intelligence, particularly to systems and methods for hair color simulation, and hair color classification and more particularly to a method, device and system to provide hair color simulation using a hair color classification guided network.

BACKGROUND

Due to the increasing popularity of online shopping, e-commerce companies have been exploring ways to improve customer experience. Virtual try-on (VTO) technology was developed to assist customers in searching for products and virtually experiencing the product, for example, to find one that best suits them. In some VTO examples, it can be assistive to determine information such as from a user supplied image. For example, in a hair color related VTO, a face image (e.g. head-shot) can be processed to determine, via classification, the hair color in the head-shot. FIG. 1 is a block diagram of a representative processing flow 100 that shows a general model in the form of a classifier 102 that receives a color face image 104 (e.g. a head-shot) and identifies a hair color 106, in accordance with the prior art. The output, along with the color face image, can later be used for virtual hair dye try-on.

Multiple challenges are presented when developing a hair color classification model. For example, color labels collected from hair experts are subject to human biases, and labeled data are expensive to obtain. It is desired to have an improved hair classification model that can identify hair color.

A VTO pipeline can simulate hair color, for example, using a generative neural network. Improvements in simulation using generative networks is desired.

SUMMARY

Aspects of hair simulation, and networks therefor are provided including aspects to train such networks. There is provided a generative model for hair simulation that is guided during its training by a hair classifier model. The generative model, in an embodiment, is provided for use in a virtual try-on (VTO) pipeline such as for virtually trying on hair color products. Further provided is a color mapping network to process an input image and target hair color for the generative model to define the hair simulation (e.g. as an output image with simulated hair color).

Aspects of VTO pipelines, and networks therefor are provided including aspects to train such networks. Further in accordance with an embodiment, there is provided a classifier model to alleviate the impact of human bias where the modeling of the real label distribution and annotators' biases are separated by incorporating annotator confusion matrices into a baseline model. To further improve the model performance leveraging unlabeled data, the model was trained using a consistency-based semi-supervised learning framework. With the use of only 1000 labeled data, the final classifier model achieved a classification accuracy that was 20% higher than a human professional annotator. The trained model can be used for a wide range of downstream tasks, including being used as a color classifier to train generative models for hair color translation.

The following statements provide various aspects and features disclosed in the embodiments herein. These and other aspects and features will be apparent to those of ordinary skill in the art such as computer program product aspects. It is also understood that computing device or system aspects/features may have respective corresponding method aspects/features and vice versa.

Statement 1: A computing device comprising a processor coupled to storage device storing instructions executable by the processor to cause the computing device to: process an input image and a target hair color using a virtual try on (VTO) pipeline to produce a VTO experience that simulates the target hair color with the input image to produce an output image; wherein the VTO pipeline comprises a color refinement neural network to generate the output image combining the target hair color and the input image, the color refinement neural network comprising a generative neural network trained under guidance of a hair classification network comprising a shade classifier that outputs a hair shade value and a reflectance classifier that outputs a hair reflectance value for determining training loss information from output images for training the generative neural network.

Statement 2: The computing device of Statement 1, wherein the instructions are executable by the processor to cause the computing device to provide an interface to one or both of: i) a color recommendation engine to recommend a target hair color; and ii) an e-commerce service with which to buy one or both of a product or service.

Statement 3: The computing device of Statement 1, wherein the VTO pipeline comprises a color mapping network trained to produce a color map for input to the generative neural network to produce the output image for the VTO experience, the color map produced from features of the image, image hair color data determined from the image, and the target hair color.

Statement 4: The computing device of Statement 3, wherein the color mapping network comprises an encoder to determine the features from the input image; a concatonator to combine the features, the target hair color and the image hair color data for processing by a first fully connected block, and a second block for processing an interim map from the first block with the image hair color data to produce the color map for input to the generative neural network.

Statement 5: The computing device of Statement 4, wherein the VTO pipeline comprises a hair analysis engine for determining the image hair color data from the input image.

Statement 6: The computing device of Statement 1, wherein the input image and target hair color are defined using RGB values such that the generative neural network is trained to produce an output image using particular RGB values as guided during the training by the hair classification network using hair shade values and reflectance values.

Statement 7: The computing device of Statement 6, wherein the hair classification network is defined and trained according to an industry standard for hair color classification comprising a respective plurality of classes for hair shade and hair reflectance.

Statement 8: The computing device of Statement 1, wherein the hair classification network comprises an encoding backbone and each of the shade classifier and the hair reflectance classifier comprises a respective linear classifier.

Statement 9: The computing device of Statement 8, wherein the hair classification network having been defined through training with a sum of shade and reflectance cross entropy losses determined from i) outputs of hair shade values and hair reflectance values, and ii) target labels for hair shade and hair reflectance, the target labels prepared for hair classification network training images from respective expert votes by a plurality of experts.

Statement 10: The computing device of Statement 9, wherein the target labels comprise soft labels for at least some of the training images, the soft label determined from an empirical distribution of the expert votes over the respective classes.

Statement 11: The computing device of Statement 9, wherein one of: the hair classification network having been trained with respective annotator confusion matrices comprising a plurality (n) of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together; or the hair classification network having been trained in accordance with a mean teacher framework.

Statement 12: A method of configuring a neural network that classifies hair shade and hair reflectance of hair in an input image, the method comprising: providing the neural network, the neural network comprising an encoding backbone coupled to i) a shade classifier that outputs a hair shade value and ii) a reflectance classifier that outputs a hair reflectance value, each classifier comprising a linear classifier; providing a plurality of training images associated with respective training labels for each of hair shade and hair reflectance, the target labels prepared from respective expert votes by a plurality of experts; and training the neural network using the training images, the training performed in accordance with a sum of shade and reflectance cross entropy losses determined from i) classifier outputs of the hair shade values and hair reflectance values, and ii) the target labels.

Statement 13: The method of Statement 12, wherein the training comprises training the neural network using a mean teacher framework.

Statement 14: The method of Statement 12, wherein the training comprises training the neural network using respective annotator confusion matrices comprising a plurality (n) of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together.

Statement 15: A method comprising: providing a generative neural network that generates an output image combining a target hair color with an input image; providing a hair classification network as a component of a discriminator of the generative neural network, the hair classification network comprising i) a shade classifier that determines an output hair shade and ii) a reflectance classifier that determines an output hair reflectance; determining training loss information using the target hair color and the output hair shade, and output hair reflectance; and training the generative neural network under guidance of the hair classification network using the training loss information.

Statement 16: The method of Statement 15, wherein the target hair color, input image and output image are defined using RGB type data and the output hair shade and output hair reflectance are defined in accordance with an industry standard for hair color classification comprising a respective plurality of classes for hair shade and hair reflectance.

Statement 17: The method of Statement 15 comprising, prior to training the generative neural network, pre-training a color mapping network configured to process the input image and, image hair color data from hair pixels of the input image and the target hair color to provide a color map to the generative neural network for generating the output image from the input image.

BRIEF DESCRIPTION OF THE DRAWINGS

FIG. 8 is a block diagram of a computing device in accordance with an embodiment.

DETAILED DESCRIPTION

Figure 1:
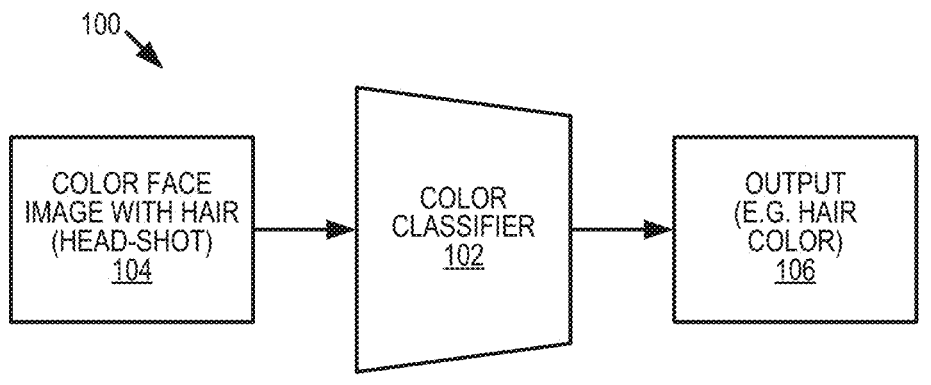
FIG. 1 is a block diagram showing a classifier model in accordance with the prior art.

Systems, methods and techniques herein seek to improve existing hair color try-on technology by leveraging artificial intelligence (AI). Many current hair simulation efforts are mainly based on traditional computer vision engineering techniques and there are instances were hair texture in the simulated images looks synthetic—e.g. obviously and poorly simulated. The present applicant seeks to utilize AI to improve the photorealism of simulated hair images while maintaining color accuracy on the simulated hair. A primary focus is color accuracy, and a hair color classification model is described herein in one or more embodiments, to identify hair color in selfie photos.

In accordance with an embodiment, hair color is defined based on L'Oréal's hair color definition for hair dye products and categorizes hair color based on 1) shade, and 2) reflectance, namely, primary and secondary reflectance. Hair shades are categorized into 10 classes, where 1 is lightest and 10 is darkest. In an embodiment there are 9 reflectance classes for each of the primary and the secondary reflectance, where primary reflectance indicates the dominating reflectance in the hair, and secondary reflectance indicates the second dominating reflectance. Hair may have only primary reflectance or no reflectance. If considering no reflectance as a separate class of reflectance, there are 100 combinations of primary and secondary reflectance. Examples include: no primary or secondary reflectance, gold primary reflectance with no secondary reflectance, ash primary reflectance with no secondary reflectance, gold primary reflectance with ash secondary reflectance, and gold primary reflectance with mahogany secondary reflectance, and so one.

Labeled datasets from hair color experts exist or are obtainable for hair color. However, such datasets, particularly the use thereof, present challenges to building a hair color identification model. For example, the hair colors are defined based on professional hair experts' judgment instead of basing off scientific color definitions, such as average RGB color. Hence, the existing color definition is subject to human biases. Since the annotations were provided by hair experts, labeled data is expensive to obtain and can result in a limited number of labeled examples with which to train and verify, etc.

It was desired to develop a hair color classifier to produce color predictions that are at least as accurate as an average human hair expert. Annotations of 1000 selfies images from 10 hair experts were received to define a dataset for use to develop the model—the "expert dataset". The model performance was evaluated based on how agreeable it is with the majority of the annotations from the hair experts or how far the predictions deviate from the experts' annotations.

The expert dataset was relatively small in size, particularly as data was obtained gradually as the experts completed their tasks at different times. Moreover, the results when combined illustrated differences of expert opinion. 1000 labeled images is a relatively small dataset given that there were more than 100 hair colors. After gradually receiving labels from other hair experts, it was determined that the labels from different hair experts often did not agree with one another. There were cases in which there were no clear majority votes on hair color, and all 10 experts thought that the hair was of different colors. Because of that, a goal of the activities included alleviating the impact of label noises.

To handle these two challenges, a final model in accordance with an embodiment, includes two improvements on a standard (prior art) classifier (e.g. of FIG. 1), adding annotator confusion matrices and using a Mean Teacher semi-supervised learning framework. Adding annotator confusion matrices aims to alleviate the problem of label noises by modeling individual experts' biases, whereas the Mean Teacher framework is a semi-supervised learning technique that alleviates the problem of limited labeled data by using unlabeled data during training.

Label Noise

In the real world, data are often labeled by multiple annotators. As biases in human annotators are inevitable, these labels often contain noises and annotators may disagree with one another. There are studies showing that the ratio of corrupted labels in real-world datasets ranged from 8% to 39% [19][16][9][8]. A conventional way to handle label noises is to aggregate annotations using majority vote. However, the majority vote method has some limitations, for instance, it only uses the class with the highest number of votes as the aggregated label and ignores the distribution of votes, and there may be scenarios that there are no clear majority votes. An alternative way to aggregate the annotations is to use soft labels in which the soft label values are based on the empirical distribution of the votes.

Model-based approaches have also been explored to handle label noises, including using a translation matrix to measure the noises, and re-weighting labels based on label confidence. Transition matrix is widely used to model the relationship between real distribution and observed distribution [5][13]. These methods, however, often do not consider that different annotators may have different biases. On the other hand, loss re-weighting has also been studied to improve model robustness by assigning more weights to labels or models with higher confidence [10]. In particular, Weighted Doctor Net [4] proposed to model individual annotators separately and then combine the predictions of the individual models using learned averaging weights. This method considers the annotators' overall skill level across all data classes and ignores the scenario that the annotators may have different skill levels when labeling various classes. Inspired by that, Tanno et al. [17] combined the use of transition matrix with loss re-weighting, and proposed to model annotators' labels and ground truth separately through annotator-specific confusion matrices.

Annotator Confusion Matrix

The annotator confusion model [17] is a probabilistic model based on assumptions that annotators are independent and the label noises are independent of the input images. Based on these two assumptions, the joint probability of observing n labels for an image from n annotators can be expressed as:

$$P(\tilde{y}^{(1)} \ldots \tilde{y}^{(n)} \mid x) = \prod_{i=1}^{n} \sum_{j=1}^{c} a_{\tilde{y}^{(i)},y}^{(i)} P(y \mid x) \qquad \text{Eq. 1}$$

where $\tilde{y}^{(n)}$ is the annotation from the $n^{th}$ annotator and x is the image, y is the real color and $$a_{\tilde{y}^{(i)},y}^{(i)}$$

is a value in the confusion matrix that indicates the probability of the annotator denote an image as class $\tilde{y}$ given the real class is y. During training, the annotator-specific confusion matrices are jointly trained with the classifier, in which the classifier learns to predict the true label distribution and each confusion matrix learns the observed label distribution given the true labels for a particular annotator.

Semi-Supervised Learning

Labeled data are often expensive to obtain while unlabeled data are usually abundant and provide additional information about the data distribution. To leverage the information in unlabeled data, semi-supervised learning (SSL) [3]1[21] is a research area that explores ways to train models using both labeled and unlabeled data. Typical semi-supervised learning techniques include consistency regularization and pseudo labeling [7].

Consistency regularization was first introduced by the Γ model [14] and suggests that the model should give similar data points with consistent outputs. To encourage models to do so, the Γ model applies a consistency loss between data points with and without noise. Following that, Temporal Ensembling [6] proposes to improve the model by maintaining an exponential moving average (EMA) prediction of the training data. Mean Teacher [18] is an extension of the Γ model and Temporal Ensembling, and suggests maintaining an exponential moving average of model weights through a student-teacher framework. The student model is trained based on a supervised classification loss and an unsupervised consistency loss with the teacher model. The consistency loss is applied to minimize differences between the outputs from the student and teacher models. The weights of the teacher model are updated based on the EMA of the student model. Mean Teacher framework achieved state-of-the-art results on semi-supervised learning image classification benchmarks.

Recent state-of-the-art of models in SSL often combine multiple SSL techniques, including combing consistency regularization with pseudo labeling [2][1][15]. FixMatch [15] is based on the idea that data augmentation has a significant impact on consistency regularization [20], and proposed to train the classifier such that it procedures consistent output for various augmentation of the same output with the use of pseudo labels. This method produces state-of-the-art results in image classification tasks. However, since they rely on strong augmentations that alter color in images, they are not applicable for color classification.

Model Architecture

Baseline Model

Figure 2:
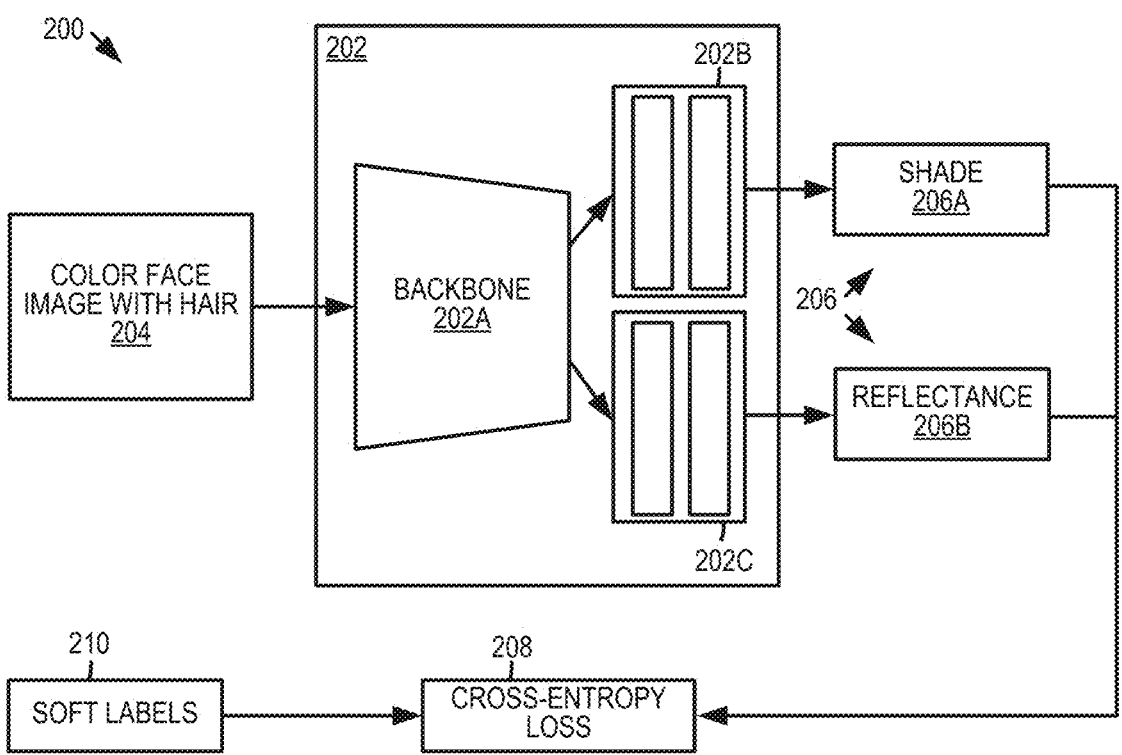
FIG. 2 is a block diagram showing a baseline classifier model in accordance with an embodiment.

FIG. 2 shows a block diagram of a processing flow 200 in accordance with an embodiment an in which a baseline model 202 receives an image 204 as input and outputs predictions 206 comprising hair shade 206A and reflectance 206B. In an embodiment, baseline model 202 uses ResNet18 202A as its backbone. Output from the backbone 202A is passed to two linear classifiers 202B and 202C that separately predict the shade 206A and the reflectance 206B. In an embodiment, each linear classifier consists of two fully connected linear layers with a ReLu activation layer between the two layers. In an embodiment, flow 200 represents a training flow at a training time. Components 202 are retained for inference time use.

In an embodiment, the baseline model 202 was trained using a sum of shade and reflectance cross-entropy losses (e.g. 208) between the model outputs 206A/206B and the target colors (e.g. soft labels 210) prepared from the expert labels.

Hard and Soft Labels

When training the baseline model of FIG. 2, both hard and soft labels are tested. The hard labels for shade and reflectance are calculated separately based on the class with the highest number of votes. The soft labels are calculated based on the empirical distribution of labels from all annotations. For example, if nine experts label the image as class 1, and an expert labels that as class 2, the soft label will be 0.9 for class 1, 0.1 for class 2 and 0 for all other classes. Regardless of soft or hard labels, the baseline models are trained based on cross-entropy loss (e.g. 208).

Classifier with Annotator Confusion Matrices

Figure 3:
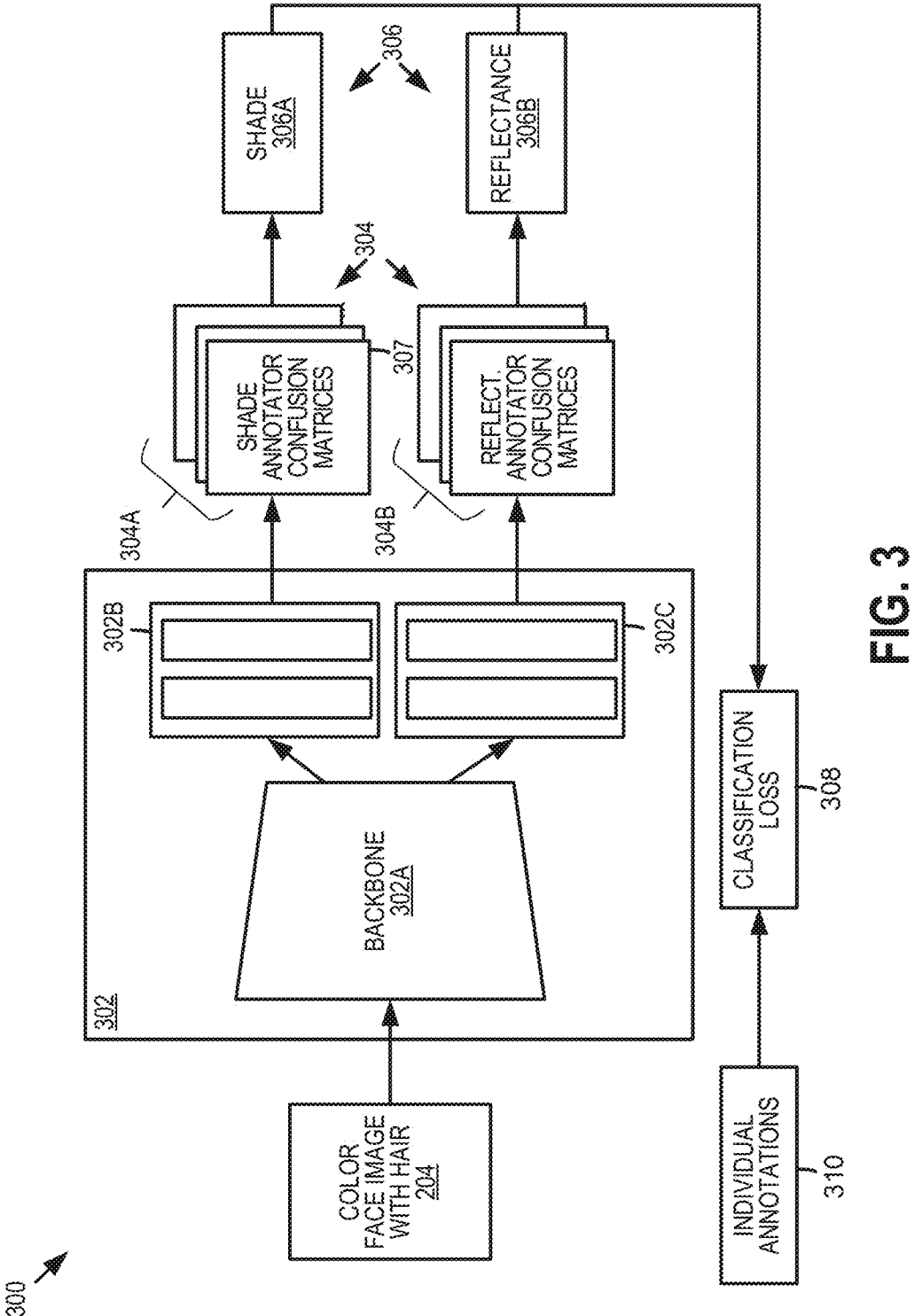
FIG. 3 is a block diagram showing the baseline classifier model of FIG. 2 as adapted with annotator confusion matrices in accordance with an embodiment.

FIG. 3 is a block diagram of a processing flow 300 showing a classifier 302 in accordance with an embodiment of FIG. 2. Classifier 302 is adapted through training using annotator confusion matrices 304 as further described. Processing flow 300 is useful at a training time and components 302 are useful at an inference time.

In an embodiment, the components 302A to 302C of classifier 302 are similarly structured to components 202A to 202C of classifier 202 but are adapted such as by training with the annotator confusion matrices 304 as described. Output shade 306A and reflectance 306B is also similar to output 206A and 206B but will depend on the trained classifier 302. The outputs of the respective classifiers for a same input image can vary in value.

In accordance with an embodiment, annotator confusion matrices 304 comprise a plurality (n) of shade annotator confusion matrices 304A and a plurality (n) of reflectance annotator confusion matrices 304B. Here, "n" refers to the number of annotators.

Figure 4:
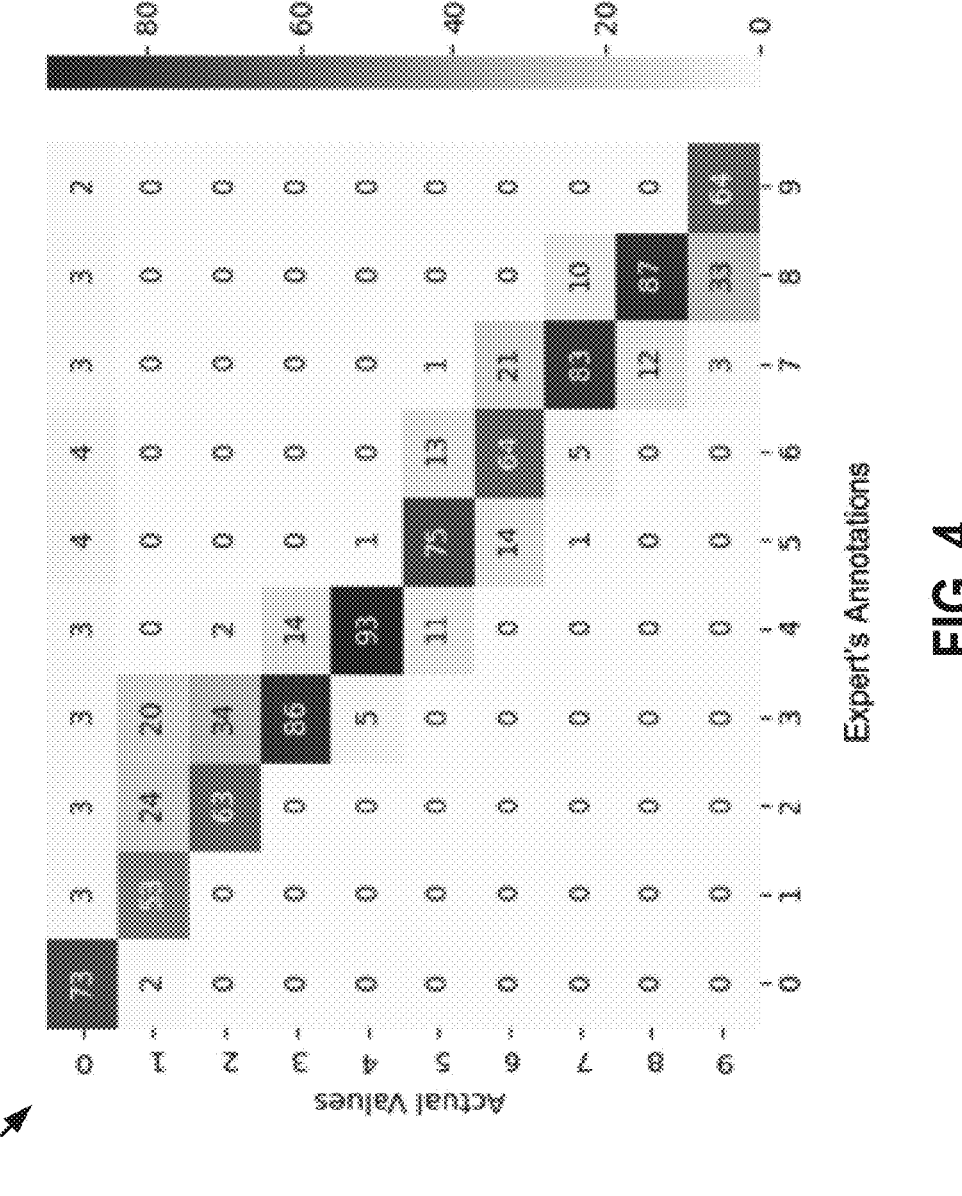
FIG. 4 is a diagram of a representative annotator confusion matrix.

FIG. 4 is an illustration of a representative shade annotator confusion matrix 400, in accordance with an embodiment. Rows represent real classes ("Actual Values") and the columns represent the observed annotations ("Expert's Annotations").

In an embodiment, classifier 302 with annotator confusion matrices 304 is built on top of baseline model 202, having annotator-specific confusion matrices 304 after the respective classification layers (202B/202C) of baseline model 202 to predict the observed labels 306A/206B from annotators. Assuming that there are "n" annotators, n 10*10 confusion matrices are added after the shade classifier and n 100*100 confusion matrices are added after the reflectance classifier. The outputs 306A/306B from the shade and reflectance classifiers 302B/302C are multiplied by the respective confusion matrices 304A/304B to predict the annotations of individual annotators. For example, the outputs of the shade classifier 302B are multiplied by the first shade confusion matrix (e.g. 307) to predict the shade annotation for the first annotator.

During training, for each training data, the sums of n shade and n reflectance cross-entropy losses (e.g. 308) are calculated to update the model. Since an annotator only has one shade and one reflectance label for each training data, each cross-entropy loss was calculated using hard labels (e.g. 310) instead of soft labels (e.g. 210). The confusion matrices are initially randomly assigned with values such that the diagonal values are dominating and the matrices are approximately identical matrices. The matrices are trained together with the rest of the model based on the classification loss 308 and a regularization term is added to encourage the learned matrices to converge to the real confusion matrices (e.g. as per the example of FIG. 4).

Mean Teacher Framework

Figure 5:
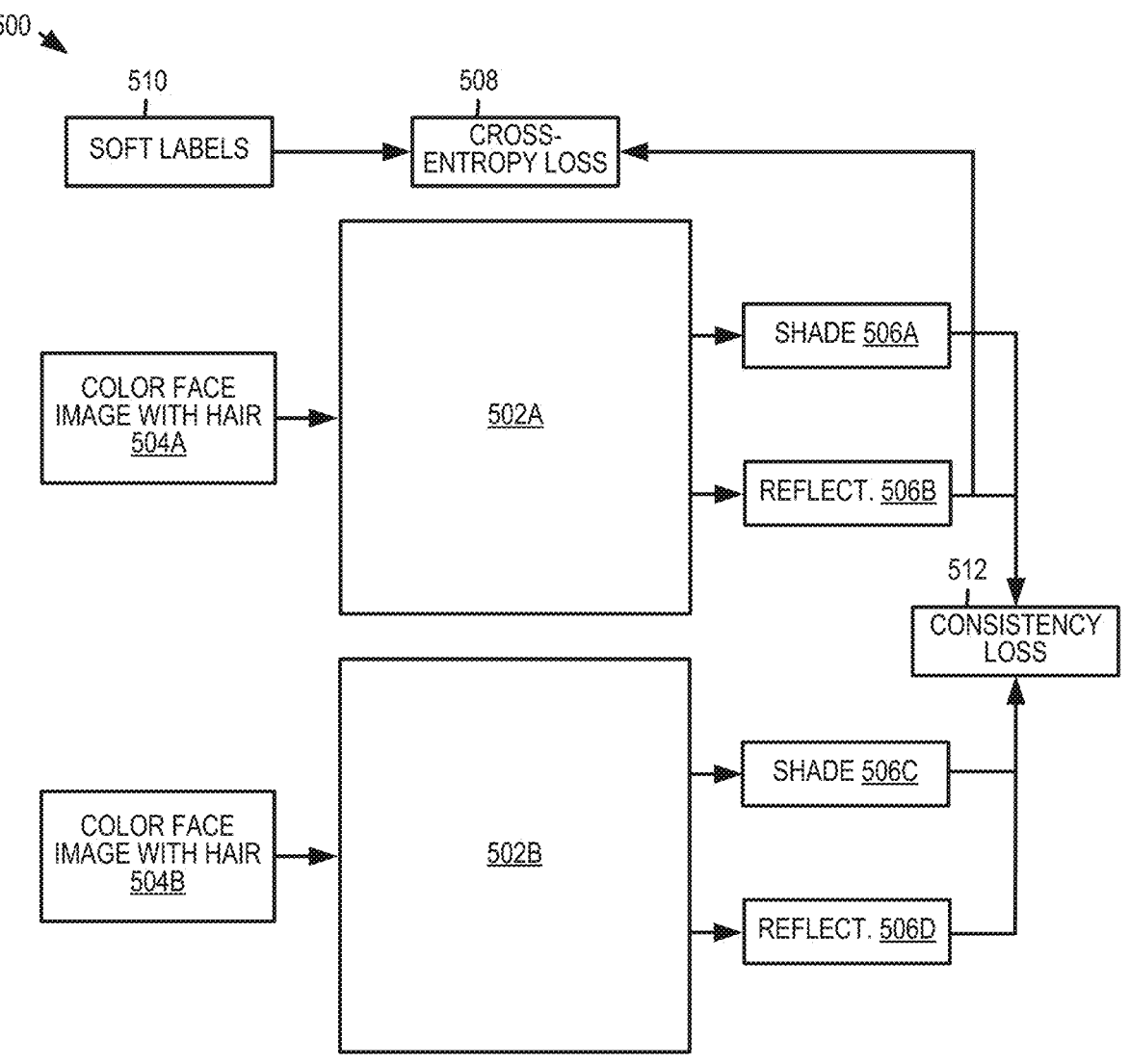
FIG. 5 is a block diagram showing the baseline classifier model of FIG. 2 as adapted with a Mean Teacher Framework in accordance with an embodiment.

FIG. 5 is a block diagram of a processing flow 500 showing the baseline classifier model 202 of FIG. 2 as adapted to a Mean Teacher Framework for training. The flow 500 comprises a student model 502A and a teacher model 502B, in accordance with an embodiment. The models 502A and 502B are configured as instances of model 202 such that the details are not shown in FIG. 5. Student model 502A produces output comprising shade output 506A and reflectance output 506B and teacher model 502B produces output comprising shade output 506C and reflectance output 506D, respectively.

The student model 502A and teacher model 502B are first pre-trained using the labeled data. During the semi-supervised learning process, two augmented versions of the same image (e.g. 504A and 504B) are passed separately to each of the models 502A/502B. The student model 502A is trained using (supervised) cross-entropy loss 508 and (unsupervised) consistency loss 512. The cross-entropy loss (classification loss) is computed based on the labeled data (e.g. 510), and the consistency loss is calculated as the mean squared error of the softmax outputs (506A, 506B and 506C, 506D) between the student model 502A and teacher model 502B. The consistency loss 512 based on the augmented images 504A, 504B forces the student model 502A to give consistent outputs to similar data points. After the student model 502A is updated, the teacher model 502B is updated based on the exponential moving average of the model weights of the student model 502A. In accordance with an embodiment, during inference, only the teacher model 502B is retained and used for evaluation.

Experiments

Dataset

The selfie dataset used during the experiments contained 1000 labeled images and 2500 unlabeled images. For the labeled data, the hair in the selfie was annotated by 10 professional hair experts and each label contained a shade, a primary and a secondary reflectance. In an embodiment, the shade values range from 1 to 10 where 1 was the darkest shade, and the primary and secondary reflectance values range from 0 to 8. The hair color may also have no secondary reflectance or no primary reflectance.

The labels from different annotators may disagree with one another. However, for most of the labeled images, there were at least two annotations that agree with each other. Out of the 1000 images, only 40 did not have any agreement. When looking at the shade, primary and secondary reflectance values individually, agreements from at least two annotators were always present. To assess the quality of the annotators, Table 1 lists out the accuracy and mean absolute shade difference between the labels from individual annotators and the majority vote. The overall color agreement was just around 30%, experts disagreed more with reflectance values (49%) than shades (64%). In particular, only 42% of the time, experts agreed on secondary reflectance values.

TABLE 1

| Annotator | Ave. | 1 | 2 | 3 | 4 | 5 | 6 | 7 | 8 | 9 | 10 |
|---|---|---|---|---|---|---|---|---|---|---|---|
| Overall Accuracy (%) | 30 | 33 | 20 | 31 | 21 | 41 | 39 | 34 | 30 | 28 | 21 |
| Shade Accuracy (%) | 64 | 81 | 55 | 68 | 53 | 70 | 73 | 66 | 59 | 61 | 55 |
| Reflectance Accuracy (%) | 49 | 45 | 52 | 18 | 18 | 59 | 65 | 67 | 63 | 58 | 49 |
| Primary Reflectance Accuracy (%) | 48 | 56 | 47 | 26 | 29 | 59 | 56 | 56 | 52 | 57 | 41 |
| Secondary Reflectance Accuracy (%) | 42 | 33 | 31 | 38 | 32 | 54 | 55 | 49 | 49 | 51 | 31 |

Experiment Setup

The baseline model 202 and classifier 302 with confusion matrices 304 were trained using stochastic gradient descent (SGD) optimizer, the learning rate was constant for the first 20 epochs and then linearly decayed to zero over the next 65 epochs. Simple data augmentations, including random horizontal and vertical flips, rotations, and translation, were used during the training. The batch size was set to 128.

The mean teacher framework teacher model 502B was trained using SGD optimizer, the learning rate was decayed to zero using a cosine anneal [12]. For data augmentation, random data augmentations, including horizontal and vertical flipping, rotation, translation, and shearing were used. The batch size was set to 256, with 128 labeled and 128 unlabeled data.

Evaluation Metrics

In an embodiment, model performance was evaluated based on how agreeable the model was with the majority of experts, and the magnitude that the predictions deviated from the annotations. There were three main metrics used for evaluation, accuracy, shade within ±1, and shade mean absolute difference. For shade, reflectance and overall color, accuracy was measured in terms of the model prediction matching the highest-voted color from the ten annotators. Since shades are ordinal data, two additional metrics were used; shade within ±1 measures the probability of the model predictions being within one shade difference from the highest-voted shade, and mean absolute difference measures the average distance between the predicted shades and average shade annotations for each image. The experiment results were based on 5-fold cross-validation and in each run, the metrics from the best epoch were reported.

Results

Soft vs Hard Labels

Table 2 compares the prediction performances among an average human expert, the baseline model trained with hard labels, and the baseline model trained with soft labels in accordance with an embodiment. When there were disagreements among experts, training the model with soft labels allowed the model to learn more about the distribution of votes and make better predictions. The prediction accuracies of the model trained with soft labels were 9% higher than the model trained with majority votes, with a 7% increase in shade accuracy and a 6% increase in reflectance accuracy. Another observation is that the model trained with majority votes was slightly worse than an average human expert, whereas the model trained with soft labels was better than the average human expert.

TABLE 2

|  | Human Expert | Majority | Soft Labels |
|---|---|---|---|
| Overall Accuracy (%) | 30 ± 7 | 29 ± 4 | 38 ± 4 |
| Shade Accuracy (%) | 64 ± 9 | 62 ± 6 | 69 ± 6 |
| Reflectance Accuracy (%) | 49 ± 18 | 41 ± 5 | 47 ± 4 |
| Primary Refl Accuracy | 48 ± 12 | 60 ± 6 | 66 ± 6 |

Classifier with Confusion Matrices

In an embodiment, step-wise experiments were performed to examine the impacts of adding confusion matrices to the model and training the model using the Mean Teacher Framework. In brief, either model was better than the average human expert performance. As shown in Table 3 there was an improvement in overall color accuracy (2%) when adding the confusion matrices to the model. It is noted that the baseline model trained with soft labels is a special case of the model with confusion matrices where all confusion matrices were identity matrices. The improvement of color classifications is contributed mainly by the improvement of reflectance prediction (5%) and the accuracy of shade prediction is similar to the baseline model. It is understood this results from more disagreements in the reflectance labels among hair experts.

TABLE 3

|  | Human Expert | Baseline | Confusion | Mean |
|---|---|---|---|---|
| Overall Accuracy (%) | 30 ± 7 | 38 ± 4 | 40 ± 6 | 50 ± 5 |
| Shade Accuracy (%) | 64 ± 9 | 69 ± 6 | 67 ± 3 | 73 ± 4 |
| Reflectance Accuracy (%) | 49 ± 18 | 47 ± 4 | 53 ± 6 | 58 ± 5 |
| Primary Refl Accuracy (%) | 48 ± 12 | 66 ± 6 | 68 ± 6 | 73 ± 2 |
| Secondary Refl Accuracy | 42 ± 10 | 54 ± 3 | 60 ± 5 | 63 ± 3 |

Although adding annotator confusion matrices did not improve shade accuracy, a more detailed analysis showed that its prediction deviated less from the experts' annotations. Table 4 shows a comparison of shade prediction performance among the human annotators, the baseline model with soft labels, the classifier with annotator confusion matrices, and the Mean Teacher framework. As shown in Table 4, after adding the confusion matrices, the percentage of shade within ±1 of the highest-voted shade was 1% higher and the mean absolute differences were 0.04 lower. This revealed that the shade prediction was also improved.

TABLE 4

| | Baseline Model | Confusion Matrix | Mean Teacher |
|---|---|---|---|
| Shade within ± 1 (%) | 97 ± 0 | 98 ± 0 | 98 ± 2 |
| Shade Mean Abs Diff | 0.44 ± 0.07 | 0.40 ± 0.07 | 0.32 ± 0.07 |

Mean Teacher Framework

Figure 6:
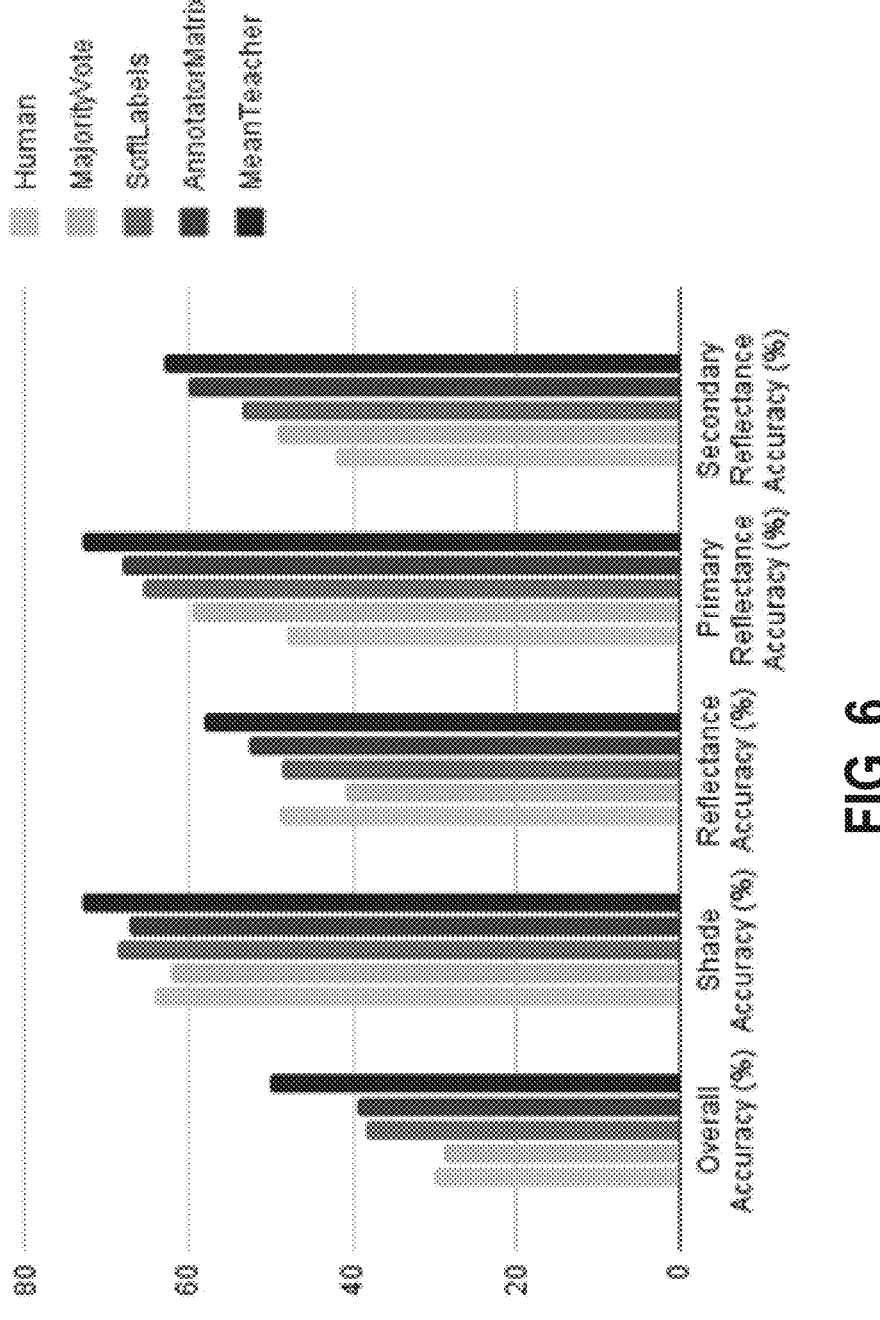
FIG. 6 is a graph, in accordance with an embodiment, showing a comprehensive comparison of model prediction accuracy results among all models and an average human expert.

After incorporating the Mean Teacher framework, the model's overall performance was significantly improved. Table 3 and Table 4 show that the framework improved prediction accuracy by 10% in comparison with the confusion matrix model, and it also reduced the difference between the model prediction and experts' annotation. The mean absolute difference was reduced by 0.08. Also, when comparing the classifier based on the Mean Teacher framework and an average human expert, there was a 20% improvement in overall color accuracy with 9% and 11% improvement in shade and reflectance accuracies. FIG. 6 is a graph 600, in accordance with an embodiment, showing a comprehensive comparison of model prediction accuracy results among all models and an average human expert. Graph 600 shows that there is significant improvement between the accuracy of an average human expert and the model from the Mean Teacher framework.

Ablation Study

To facilitate better data collection planning, an experiment was performed to investigate the impact of having additional labeled selfie images and annotators. When performing the following experiments, the baseline model with soft labels was trained to evaluate the impact of having more images, and more labels per image. When examining the impact of additional labeled images, the number of labeled data was varied from 100 to 900. When examining the impact of additional labels per image, the labels from a subset of experts were used to train the model.

Figures 7A, 7B:
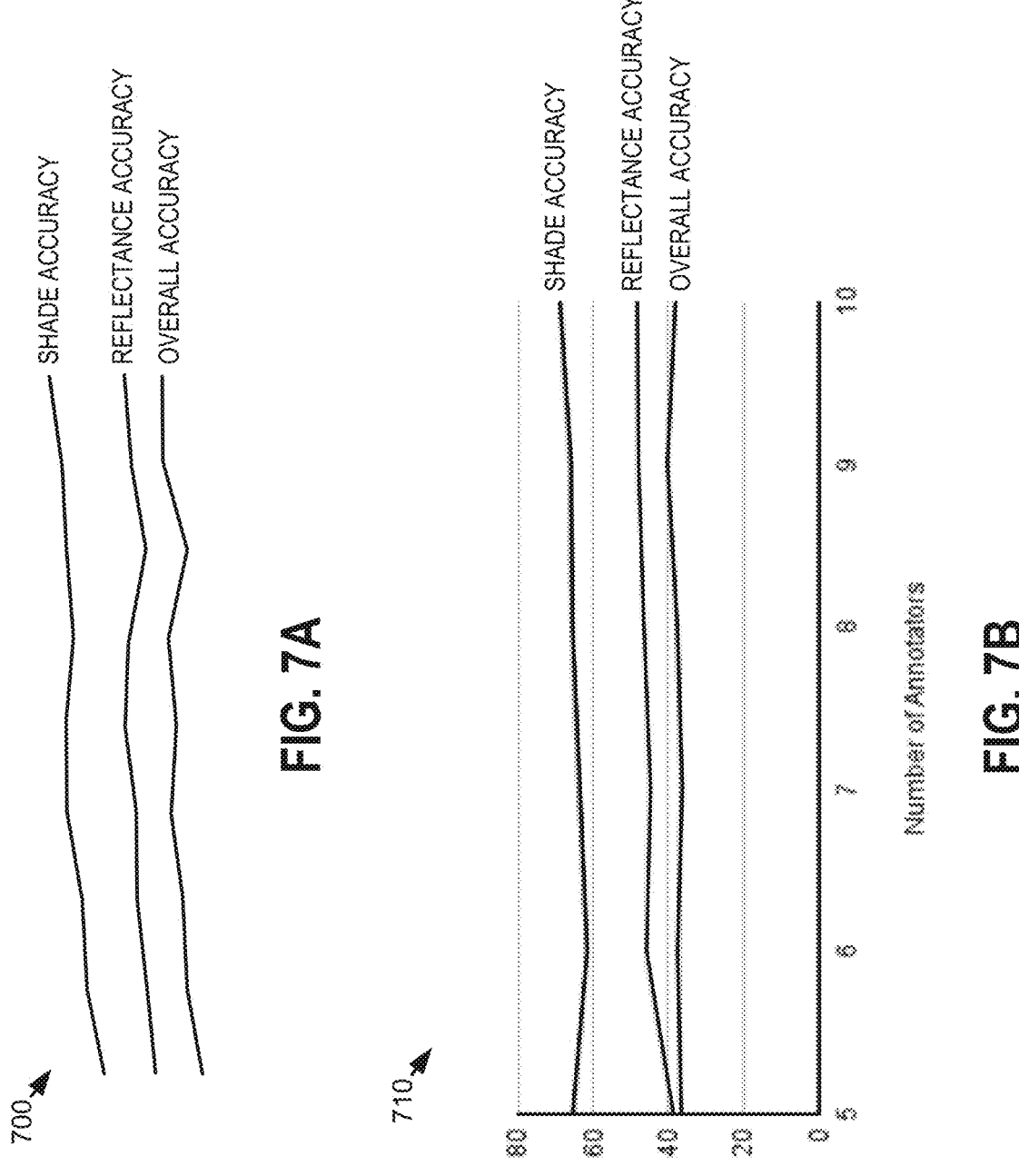
FIGS. 7A and 7B are graphs showing, in accordance with respective embodiments, an accuracy comparison of varying numbers of training selfie images (FIG. 7A), and an accuracy comparison of varying numbers of annotators (FIG. 7B).

The model performance improved when it had more selfie images or more annotators as expected. However, as shown in FIGS. 7A and 7B, the model improved more when it had more labeled images. FIG. 7A is a graph 700 showing an accuracy comparison of varying numbers of training selfie images and FIG. 7B is a graph 710 showing an accuracy comparison of varying numbers of annotators.

It was observed that a consistent increase in accuracy is achieved when changing the training images from 100 to 900, where the overall, shade and reflectance accuracies increased in parallel. No diminishing trend was observed in the improvement even after 900 images were used. In contrast, minimal improvement was observed in overall accuracy between having 5 and 10 annotators, in particular, not much improvement was observed in reflectance accuracy after there were 8 annotators. This showed that having extra labeled images was more efficient in improving model performance.

Hair Simulation Application

FIG. 8 is a block diagram of a computing device 800 in accordance with an embodiment. In the embodiment a color classifier in accordance with an embodiment herein is integrated with a VTO application to provide for hair color simulation. Compute device 800 provides a user computing device such as a smartphone, tablet, laptop or other computing device for operation by a user such as a consumer of hair dye products or a sales agent assisting such a user. The device may comprise a component of a larger form factor such as a kiosk for location in a retail environment, for example. Device 800 is non-limiting and is simplified for brevity.

Device 800 comprises a storage device 802, processing unit 806, camera 808, microphone/speaker 810, display screen 812 and communications sub-system 814. In an embodiment, storage device 802 comprises a memory device, e.g. one or more types of memory such as RAM, ROM, etc. Storage device 802 can include a long-term storage device such as a solid state drive (SSD) or other type of drive to store persistent data, etc. Storage device 802 stores computer readable instructions for execution by the processing unit, such that when executed, the instructions cause the computing device to perform operations such as one or more methods. Processing unit 806 comprises one or more central processing units (e.g. CPUs), and/or graphical processing units (e.g. GPUs) having one or more processors/microprocessors, controllers/microcontrollers, etc. Other processor types may be used. GPUs may be particularly useful for accelerating graphics processing tasks and/or AI processing tasks (e.g. training and/or inference).

Camera 808 can be used to take selfie images. Microphone and speaker 810 are typically separate devices though labeled together here for convenience and represent some of the input (I), output (O) or I/O devices that may be available. Other devices may include a light, a bell, a vibrator, a button, a keyboard, a pointing device (e.g. mouse or touch pad, etc.), etc.

Display screen 812 presents images such as components of a graphical user interface, camera images, etc. In an embodiment the display screen is a touch screen device, a type of I./O device, configured to receive gestural inputs (e.g. swipes, taps, etc.) that interact with region(s) of the screen and in association with user interface components (e.g. controls) presented by an application executed by the processing unit 806.

Comm. sub-system 814, in an embodiment, is configured to handle communications between device components and/ or between the computing device and external devices such as a remotely located computing device (e.g. web service, cellular network component, printer, etc.). One sub-component thereof in an embodiment is an antenna for wireless communication. One sub-component thereof in an embodiment is a wired communications interface (e.g. Ethernet, USB A, USB C, Thunderbolt (TM of Intel Corporation), etc.) to couple to an applicable cable for wired communication.

Storage device 804 stores components of a VTO application and data therefor (e.g. 820). Representative components are shown. VTO application 820 comprises user interface component 822 (e.g. screens, instructions, icons, controls, etc.) User interface provides output to a user and receive input such as input for application workflow, user selections of color choices, etc. A color classifier 824 is provided and comprises one of the classifiers 202, 302 and 502 as previously described for determining hair color information (e.g. shade and reflectance). A VTO pipeline 826 is provided to simulate hair color in association with (e.g. on or in) an input image. Color recommendation engine 828 and an associated data store 830 are provided. In an embodiment, data store 830 stores hair color data and representative images therefor such as in the form of a color swatch or colored hair image, hair reflectance images, etc. The user interface can present one or more as choices for a user to select via user input, for example, sorting or filtering examples and presenting them in groups/pages, etc. In an embodiment, color recommendation engine 828 may comprise an interface to a chat bot or a live agent to discuss a recommendation.

In an embodiment, recommendations can be made, for example, based on recommendation factors such as a user's personal information including, current hair color and user age; hair color trend data; availability of a product and or a service local to the user (e.g. within a radius): cost information; etc. In an embodiment, rules or other manner of recommending can be used to determine the recommendation (or more than one) to present to a user.

In an embodiment, a user can provide an input image with hair (e.g. 832) similar to input image 204, for classification. Shade and reflectance data 834 are generated by classifier 824. The shade and reflectance data can be provided to color recommendation engine 828 for processing (e.g. using color matching rules, color compliment rules, etc.) to select one or more colors from color data store 830 to recommend to a user via user interface component 822. The recommendation can be displayed on screen 812. The user may invoke the VTO engine (via an input to a control) to have the engine simulate the color and/or color and reflectance (e.g. target hair) using the image 832 and target hair data as input to produce an output image with simulated hair 836.

The output image with simulated hair 836 can be presented via the user interface component 822 on display screen 812. Before and after type display may be provided to compare. Comparison between two or more simulate colors (e.g. two different output images) can be displayed for comparison. Products or services or both can be purchased through interface 838. Such an interface 838 may direct the user (e.g. the computing device) to a web based e-commerce service (e.g. a website (not shown)) to make the purchase, reservation, or the like.

In an embodiment, VTO pipeline 826 comprises a generative neural network (e.g. a model) configured to generate a simulated hair image using the input image 832 and the target hair data as input. Reference is further made to FIG. 9 discussed herein below.

Other components stored in storage device 804 comprise an operating system 840, browser 842 (e.g. for browsing web pages), an email and/or message application 844 (e.g. SMS or other type) and a social media application 846. The output image with simulated hair 836 can be shared (e.g. communicated) via the apps 844 and/or 846, for example.

In another use embodiment of the color classifier, not shown in FIG. 8, color classifier 824 processes an output image from a generative model configured to generate a simulated hair image using an input image having hair and target color data as input. The classifier determines color and/or reflectance data such as for comparison to the target hair data to confirm accuracy of the generative model.

The following aspects and features recited in numbered statements (Class-Statement 1, Class-Statement 2, ... Class-Statement 20) will be apparent from the disclosure herein, among others.

Class-Statement 1: A computing device comprising a processor coupled to storage device storing instructions that when executed by the processor cause the computing device to: classify hair shade and hair reflectance of hair in an input image using a neural network, the neural network comprising an encoding backbone coupled to a pair of classifiers comprising i) a shade classifier that outputs a hair shade value and ii) a reflectance classifier that outputs a hair reflectance value, each of the pair of classifiers comprising a linear classifier, the neural network having been defined through training with a sum of shade and reflectance cross entropy losses determined from i) outputs of the hair shade values and hair reflectance values, and ii) target labels for hair shade and hair reflectance, the target labels prepared for training images from respective expert votes by a plurality of experts.

Class-Statement 2: The computing device of Class-Statement 1, wherein the neural network is configured to classify the hair shade and hair reflectance in accordance with a plurality of respective classes to follow an industry standard for hair color.

Class-Statement 3: The computing device of Class-Statement 1, wherein the hair reflectance comprises a primary reflectance component and a secondary reflectance component Class-Statement 4: The computing device of Class-Statement 1, wherein the target labels comprise soft labels for at least some of the training images, the soft label determined from an empirical distribution of the expert votes over the respective classes.

Class-Statement 5: The computing device of Class-Statement 1, wherein the neural network having been trained with respective annotator confusion matrices comprising a plurality (n) of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together.

Class-Statement 6: The computing device of Class-Statement 1, wherein the neural network having been trained in accordance with a mean teacher framework.

Class-Statement 7: The computing device of Class-Statement 6, wherein the neural network comprises a teacher network obtained from the mean teacher framework.

Class-Statement 8: A method comprising: receiving an input image; and classifying hair shade and hair reflectance of hair in the input image using a neural network, the neural network comprising an encoding backbone coupled to a pair of classifiers comprising i) a shade classifier that outputs a hair shade value and ii) a reflectance classifier that outputs a hair reflectance value, each of the pair of classifiers comprising a linear classifier, the neural network having been defined through training with a sum of shade and reflectance cross entropy losses determined from i) outputs of the hair shade values and hair reflectance values, and ii) target labels for hair shade and hair reflectance, the target labels prepared for training images from respective expert votes by a plurality of experts; providing the hair shade and hair reflectance.

Class-Statement 9: The method of Class-Statement 8, wherein the hair shade and hair reflectance are provided for training a generative model to simulate hair color.

Class-Statement 10: The method of Class-Statement 9, wherein the neural network is configured to classify the hair shade and hair reflectance in accordance with a plurality of respective classes to follow an industry standard for hair color, and wherein the hair reflectance comprises a primary reflectance component and a secondary reflectance component.

Class-Statement 11: The method of Class-Statement 9, wherein the neural network having been trained with respective annotator confusion matrices comprising a plurality (n)

of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together.

Class-Statement 12: The method of Class-Statement 9, wherein the neural network having been trained in accordance with a mean teacher framework.

Class-Statement 13: The computing device of Class-Statement 12, wherein the neural network comprises a teacher network obtained from the mean teacher framework.

Class-Statement 14: The method of Class-Statement 9, wherein the target labels comprise soft labels for at least some of the training images, the soft label determined from an empirical distribution of the expert votes over the respective classes.

Class-Statement 15: The method of Class-Statement 14, wherein the input image is associated with at least one of the target labels and wherein step b. is performed to train the neural network using the input image.

Class-Statement 16: The method of Class-Statement 15, comprising training the neural network with respective annotator confusion matrices comprising a plurality (n) of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together.

Class-Statement 17: A computer program product comprising a non-transient storage device storing computer executable instructions that, when executed by a processor of a computing device, cause the computing device to: classify hair shade and hair reflectance of hair in an input image using a neural network, the neural network comprising an encoding backbone coupled to a pair of classifiers comprising i) a shade classifier that outputs a hair shade value and ii) a reflectance classifier that outputs a hair reflectance value, each of the pair of classifiers comprising a linear classifier, the neural network having been defined through training with a sum of shade and reflectance cross entropy losses determined from i) outputs of the hair shade values and hair reflectance values, and ii) target labels for hair shade and hair reflectance, the target labels prepared for training images from respective expert votes by a plurality of experts.

Class-Statement 18: The computer program product of Class-Statement 17, wherein execution of the instructions cause the computer to provide the hair shade and hair reflectance are provided for training a generative model to simulate hair color.

Class-Statement 19: The computer program product of Class-Statement 17, wherein execution of the instructions cause the computing device to classify the hair shade and hair reflectance in accordance with a plurality of respective classes to follow an industry standard for hair color; and wherein the hair reflectance comprises a primary reflectance component and a secondary reflectance component.

Class-Statement 20: The computer program product of Class-Statement 17, wherein one or both of: execution of the instructions cause the computing device to provide the neural network for classification wherein the network having been trained with respective annotator confusion matrices comprising a plurality (n) of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together; or execution of the instructions cause the computing device to provide the neural network for classification wherein network having been trained in accordance with a mean teacher framework.

Classifier Guided Training of a Color Refinement Neural Network

Figure 9A:
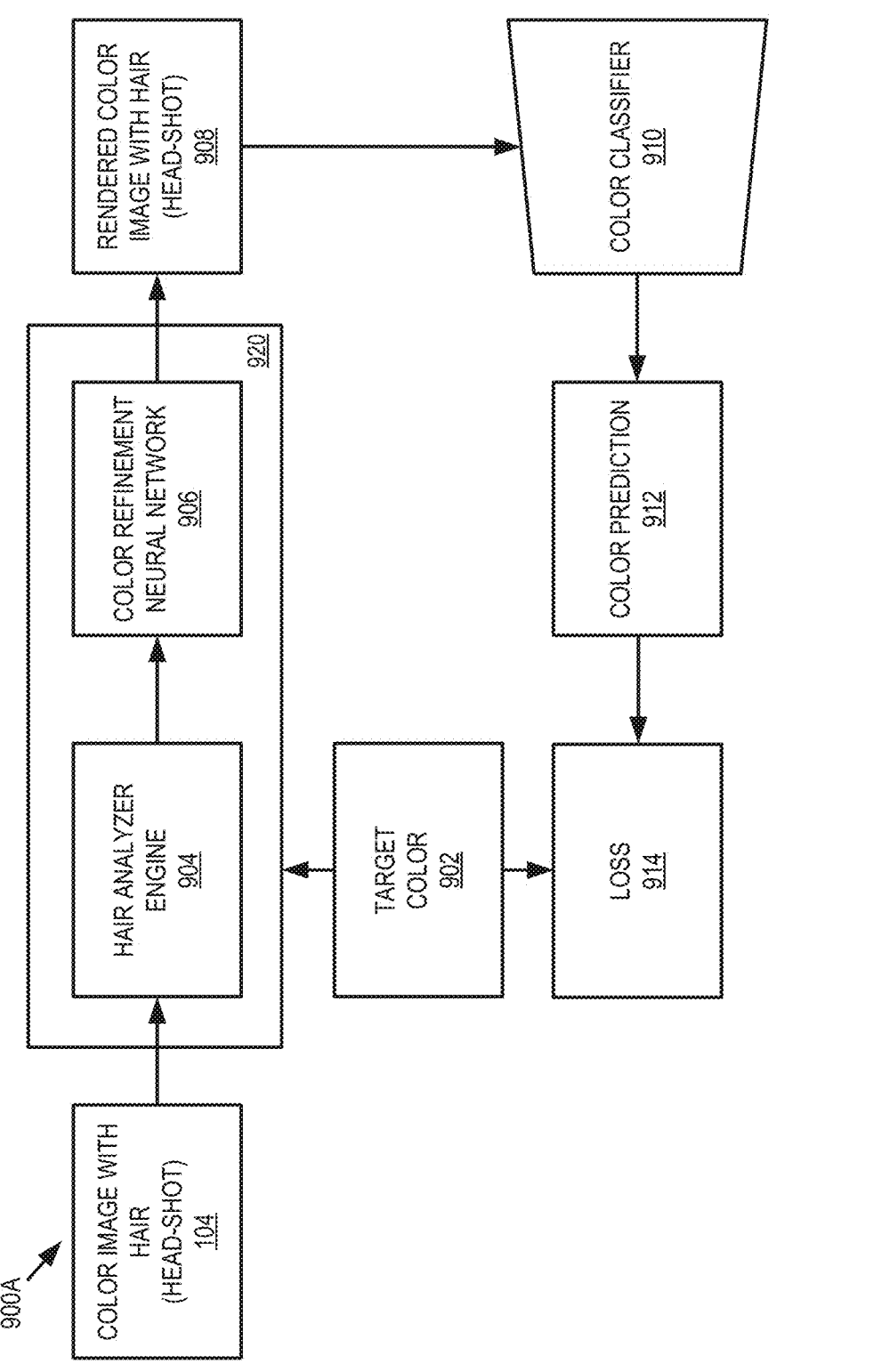
FIGS. 9A, 9B and 9C are block diagrams of network systems in accordance with an embodiment.
Figure 9B:
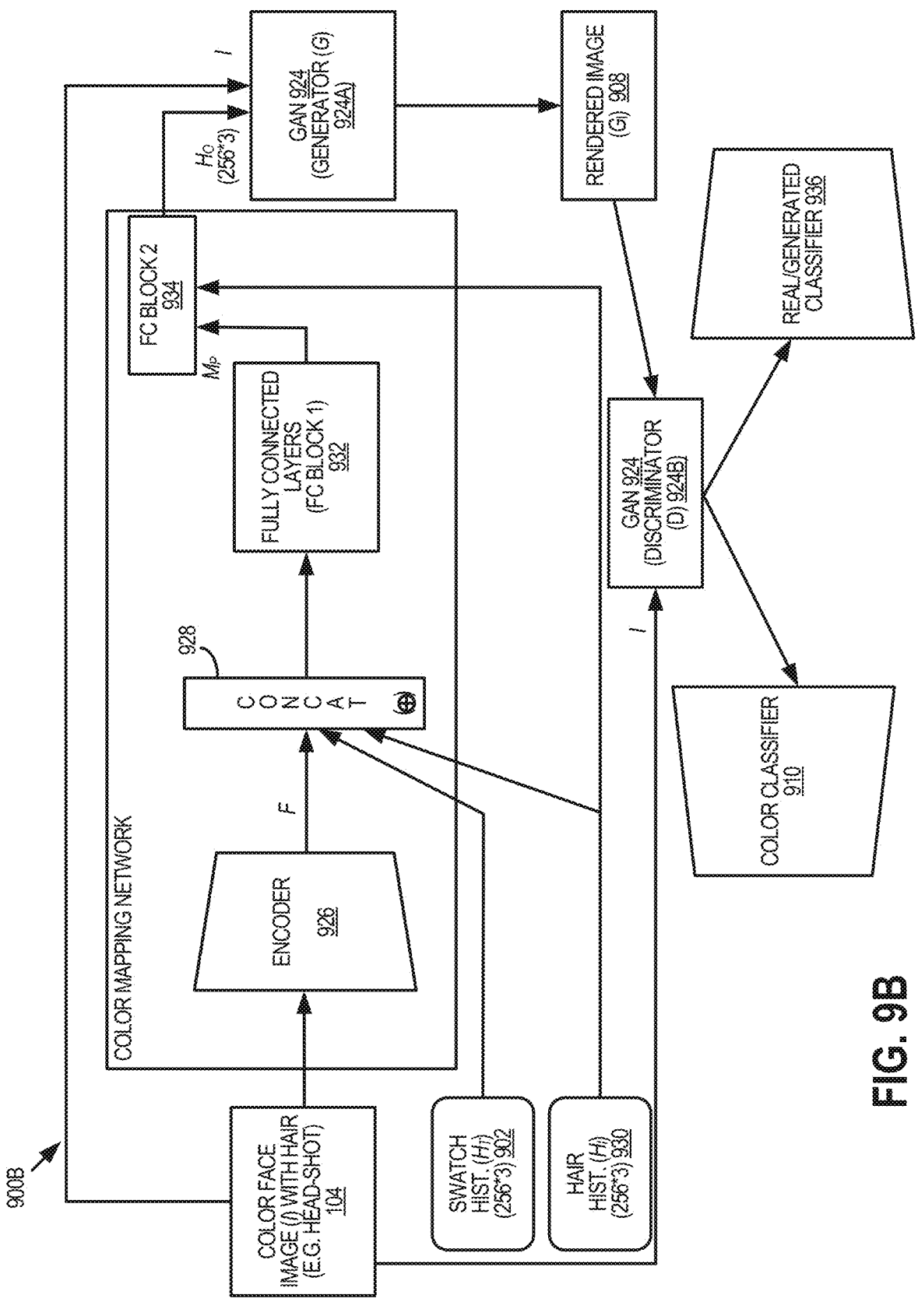

In an embodiment, a classifier can guide the training of a color refinement neural network that is configured to produce rendered images with target hair color. It is challenging to evaluate hair rendering accuracy based on just RGB values or simple metrics. In an embodiment, there is a feedback loop in a rendering network system to use a color classifier trained in accordance with an embodiment herein to guide the rendering network. FIG. 9A is a block diagram of a network system 900A in accordance with an embodiment providing a training system. FIG. 9B is a block diagram showing further details of a training network system 900B related to system 900A, in accordance with an embodiment. Method, computer program product and other aspects will be apparent to those of skill in the art from an understanding of the training aspects and inference aspects shown and described.

Network system 900A shows input image 104 (e.g. image I) and a target hair color 902 provided to a hair analyzer engine 904 to determine hair information for hair pixels (e.g. from hair segmentation) for example, hair histogram color data for image I. In an embodiment, image I, target hair color 902 (e.g. as a hair swatch image) and hair histogram color data from the image comprise RGB data (e.g. 256*3) commonly used for images. In an embodiment hair analyzer engine 904 comprises or communicates with a hair analyzer such as a hair classifier network to determine hair pixels in input image 104. In an embodiment, image I, and color information (e.g. histogram data) for the target hair color 902 and the hair of image I (e.g. as a histogram (not shown as such in FIG. 9A)) are provided to a color refinement neural network 906 to produce a rendered image 908. In an embodiment, as shown in FIG. 9B, color refinement neural network 906 comprises a color mapping network and a generative network configured to edit features of an image it processes, namely, hair color. The generative network in an embodiment comprises a model (e.g. generator (G)) that is defined through training as guided by the shade and reflectance classifier 910.

With reference again to FIG. 9A, rendered image 908 is provided to color classifier 910 defined (e.g. trained) in accordance with an embodiment herein to classify shade and reflectance properties to produce color prediction 912 for the image 908. Loss 914 represents a loss determined from the color prediction 912 and the target hair color 902 such as for use to train color refinement neural network 906 as described further with FIG. 9B. In an embodiment, system 900A is configured with one or more computing devices (not shown) to provide the computing components (e.g. 904, 906, 910, among others) and to store data (e.g. 104, 902, 908, 912, 914, among others). A display device (not shown) can be included to display image 104, 908, and any of the other data, including output (not shown) from hair analyzer engine 904 provided to color refinement neural network 906.

In an embodiment, components of network system 900A and 900B can be configured as an inference time system (e.g. following training) to provide a virtual try on experience with which to simulate a hair color applied to an image. For example, components 904 and 906 are useful to define a VTO pipeline (e.g. 920) to simulate hair color, processing an input image to simulate a target hair color and produce a simulated image. In an embodiment, color refinement neural network 906 comprises a neural network defined through training as guided by the color classifier 910 as described further below.

In accordance with FIGS. 9A and 9B, a color mapping network 922 is trained to predict correct rendering parameters based on the classification results of color classifier (910). As shown in FIG. 9B, the pipeline utilizes color mapping network 922 and a generative adversarial network (GAN) 924 with a generator (G) 924A to simulate the hair rendering 908 (i.e. (G$_I$)).

A hair segmentation model (e.g. as a component of hair analyzer engine 904, and not shown in FIG. 9B) is used to extract hair masks and the engine 904 provides RGB histogram data of hair pixels (H$_I$) in (i.e. from) image I 104. Color mapping network 922 includes an encoder 926 that encodes image features (F) from image I. Encoder 926 encodes features including but not limited to color and lighting of the hair representation and in the generator, it is used to re-generate the same hair rendering.

A concatenater 928 of color mapping network 922 receives inputs: i) Swatch (i.e. target hair color) RGB histogram (H$_T$) 902, ii) source (image I) hair RGB histogram (H$_I$) 930 and iii) image features (F) from encoder 926. The three inputs are concatenated and passed through a block of fully connected layers 932 to output color mapping (M$_P$). Output color mapping M$_P$ and source RGB hair histogram H$_I$ 930 are concatenated and used as an input and passed through another block of fully connected Layers (FC Block 2 (934)) to get output RGB histogram (HO) for use by the generator (G) 924A to produce its output from image I. Thus output rendered image G$_I$ 908 is produced by replacing hair pixels with the color mapping.

In-house color mappings (M$_G$) and RGB Histograms (H$_G$) are used as ground truth labels for training the color mapping network 922 in a supervised manner. In an embodiment, the following losses are used to train the color mapping network 922:

$$\text{Loss} = L_{Color-Mapping} + L_{RGB-Histogram}$$

L2 loss between ground-truth color mapping (M$_G$) and network-predicted color mapping:

$$L_{Color-Mapping} = \sum_{i}^{n}(M_G - M_P)^2$$

L1 loss between histograms of ground-truth RGB histogram (H$_G$) and output RGB histogram (H$_O$):

$$L_{RGB-Histogram} = \sum_{i}^{n}|H_G - H_O|$$

color mapping network 922 trained, GAN 924 can be trained, such as follows, in accordance with an embodiment.

The output RGB histogram (HO) from the color mapping network 922 is used as a condition with the source image 104 as inputs to the generator (G) 924A of the GAN 924. In an embodiment, the GAN 924 is defined as a StarGAN (in accordance with the teaching of Choi, Y., et. al, "StarGAN: Unified Generative Adversarial Networks for Multi-Domain Image-to-Image Translation", IEEE Conference on Computer Vision and Pattern Recognition (CVPR), 2018, pp. 8789-8797, the entire contents of which are incorporated herein by reference), such that G$_I$=G(I, H$_O$).

It is noted that the previously trained color mapping network 922 is frozen during GAN training. That is, network 922 is not further trained or co-trained with the training of GAN 924.

The discriminative part (discriminator (D) 924B) of GAN 924 uses two classifiers, one (936) that classifies if the image is fake or real ((G$_I$) or I); and the other one (910) is the pre-trained classifier which classifies the two parts of color: shade and reflectance.

The pre-trained classifier guides and improves the generative capabilities of the GAN network and can be used independently with any GAN architecture for guidance.

Losses used for training both generator 924A and discriminator 924B parts are the same as defined in the StarGAN paper referenced hereinabove.

In an embodiment, the color mapping+GAN is labelled as a color refinement network, as it uses the guidance from the pre-trained hair classification model and stated losses above in order that the generative model refines it's outputs.

Figure 9C:
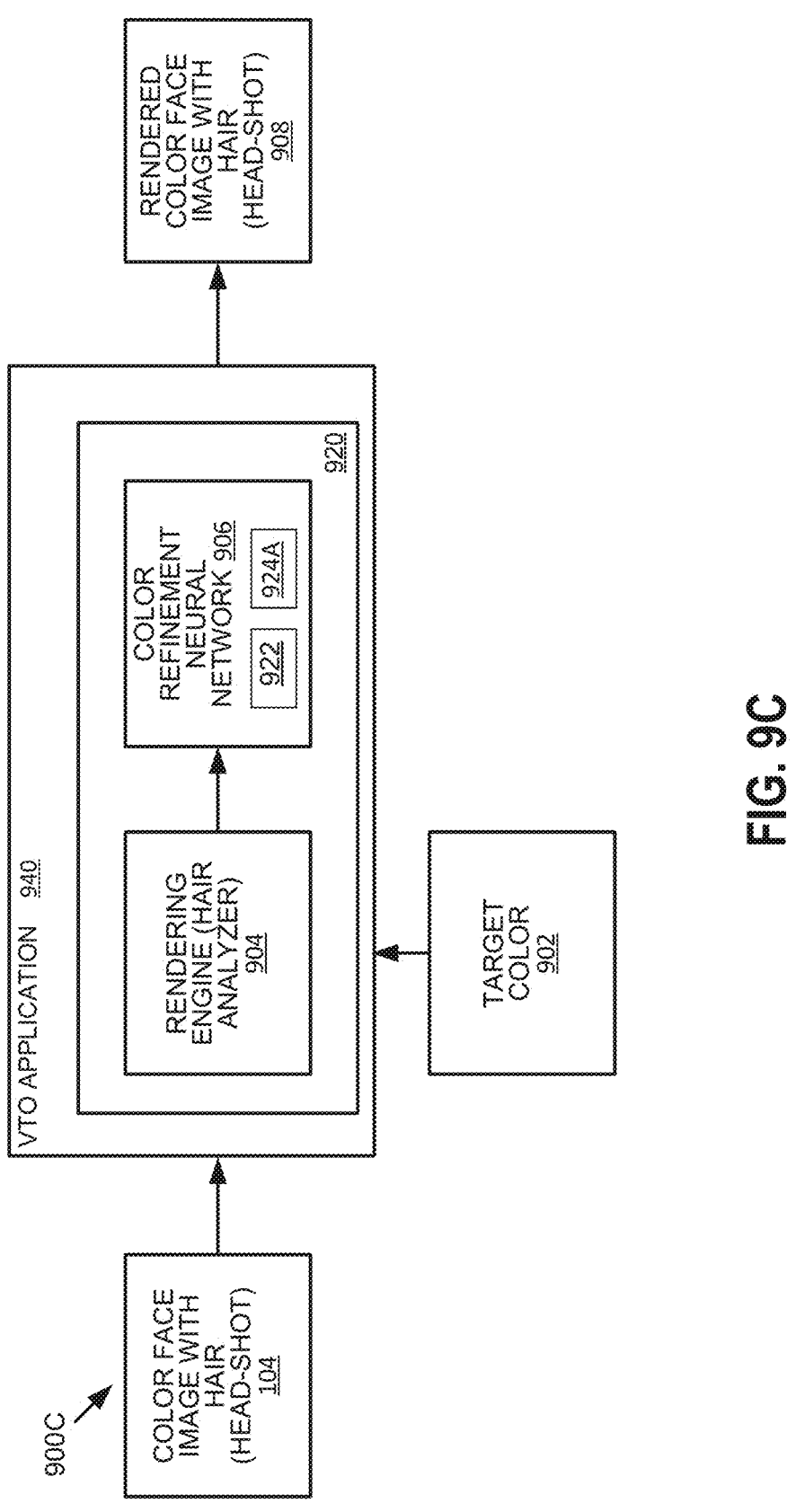

As shown in the simplified block diagram of FIG. 9C illustrating a VTO application, in an embodiment, at inference time (e.g. when training is complete and the refinement network provided to generate output images such as from user input), the discriminator component 924B with its two classifiers 910 and

CONCLUSION

In this work, techniques, etc. are provided to handle the problem of limited labeled data availability and label noises caused by human bias, for classifying attribute color in images, through a combination of a semi-supervised learning framework and annotator confusion matrices. The final model achieved an accuracy of 20% better than an average human expert.

Experiments as described herein showed that the confusion matrix is helpful in improving color prediction, in particular, in scenarios where there are more disagreements among experts. The approach mainly considers the label noises from caused by individual experts' biases and assumes that the biases only depend on the real class (e.g. without regard for other factors, such as lighting and contrast with the background). Due to the noisy nature of subjective annotation, in an embodiment, soft labels are used but not majority votes as the training labels and the confusion matrices are adapt to represent different ideas of the experts.

Experiments as described herein also showed that the Mean Teacher framework helps improve color prediction significantly. The effectiveness of the current framework depends on the teacher model giving good labels for the student model to learn.

Unlike normal RGB value prediction, the classification model is defined to classify according to a color standard defined specifically for hair. In an embodiment such a standard is in three digits, where the first digit represents the natural shades of the hair and the second and third digits represent the primary and secondary reflectance of the hair. Such a prediction of color adapts to different lighting conditions and therefore predicts dark hair in bright light and bright hair in dark light accurately. The color representation is independent of the light. The color digit prediction can directly connect to how hair products are coded in color (e.g. using the same color standard), which usually can't be expressed in a simple RGB or textural information.

The model structure uses one branch for natural shade (first digit) and one branch for the two reflectance determinations together to achieve better performance.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

Incorporated herein by reference in their respective entireties are the following documents:

[1] Berthelot, D., Carlini, N., Cubuk, E. D., Kurakin, A., Sohn, K., Zhang, H., Raffel, C.: Remix-match: Semi-supervised learning with distribution alignment and augmentation anchoring. arXiv preprint arXiv:1911.09785 (2019)

[2] Berthelot, D., Carlini, N., Goodfellow, I., Papernot, N., Oliver, A., Raffel, C. A.: Mixmatch: A holistic approach to semi-supervised learning. Advances in neural information processing systems 32 (2019)

[3] Chapelle, O., Schölkopf, B., Zien, A.: Introduction to semi-supervised learning (2006)

[4] Guan, M., Gulshan, V., Dai, A., Hinton, G.: Who said what: Modeling individual labelers improves classification. In: Proceedings of the AAAI conference on artificial intelligence. vol. 32 (2018)

[5] Hendrycks, D., Mazeika, M., Wilson, D., Gimpel, K.: Using trusted data to train deep networks on labels corrupted by severe noise. Advances in neural information processing systems 31 (2018)

[6] Laine, S., Aila, T.: Temporal ensembling for semi-supervised learning. arXiv preprint arXiv:1610.02242 (2016)

[7] Lee, D. H., et al.: Pseudo-label: The simple and efficient semi-supervised learning method for deep neural networks. In: Workshop on challenges in representation learning, ICML. vol. 3, p. 896 (2013)

[8] Lee, K. H., He, X., Zhang, L., Yang, L.: Cleannet: Transfer learning for scalable image classifier training with label noise. In: Proceedings of the IEEE conference on computer vision and pattern recognition. pp. 5447-5456 (2018)

[9] Li, W., Wang, L., Li, W., Agustsson, E., Van Gool, L.: Webvision database: Visual learning and understanding from web data. arXiv preprint arXiv:1708.02862 (2017)

[10] Liu, T., Tao, D.: Classification with noisy labels by importance reweighting. IEEE Transactions on pattern analysis and machine intelligence 38(3), 447-461 (2015)

[11] Liu, Z., Luo, P., Wang, X., Tang, X.: Deep learning face attributes in the wild. In: Proceedings of International Conference on Computer Vision (ICCV) (December 2015)

[12] Loshchilov, I., Hutter, F.: Sgdr: Stochastic gradient descent with warm restarts. arXiv preprint arXiv: 1608.03983 (2016)

[13] Patrini, G., Rozza, A., Krishna Menon, A., Nock, R., Qu, L.: Making deep neural networks robust to label noise: A loss correction approach. In: Proceedings of the IEEE conference on computer vision and pattern recognition. pp. 1944-1952 (2017)

[14] Rasmus, A., Berglund, M., Honkala, M., Valpola, H., Raiko, T.: Semi-supervised learning with ladder networks. Advances in neural information processing systems 28 (2015)

[15] Sohn, K., Berthelot, D., Carlini, N., Zhang, Z., Zhang, H., Raffel, C. A., Cubuk, E. D., Kurakin, A., Li, C. L.: Fixmatch: Simplifying semi-supervised learning with consistency and confidence. Advances in neural information processing systems 33, 596-608 (2020)

[16] Song, H., Kim, M., Lee, J. G.: Selfie: Refurbishing unclean samples for robust deep learning. In: International Conference on Machine Learning. pp. 5907-5915. PMLR (2019)

[17] Tanno, R., Saeedi, A., Sankaranarayanan, S., Alexander, D.C., Silberman, N.: Learning from noisy labels by regularized estimation of annotator confusion pp. 11244-11253 (2019)

[18] Tarvainen, A., Valpola, H.: Mean teachers are better role models: Weight-averaged consistency targets improve semi-supervised deep learning results. Advances in neural information processing systems 30 (2017)

[19] Xiao, T., Xia, T., Yang, Y., Huang, C., Wang, X.: Learning from massive noisy labeled data for image classification. In: Proceedings of the IEEE conference on computer vision and pattern recognition. pp. 2691-2699 (2015)

[20] Xie, Q., Dai, Z., Hovy, E., Luong, T., Le, Q.: Unsupervised data augmentation for consistency training. Advances in Neural Information Processing Systems 33, 6256-6268 (2020)

[21] Zhu, X., Goldberg, A. B.: Introduction to semi-supervised learning. Synthesis lectures on artificial intelligence and machine learning 3(1), 1-130 (2009)

What is claimed is:

1. A computing device comprising a processor coupled to storage device storing instructions executable by the processor to cause the computing device to:

process an input image and a target hair color using a virtual try on (VTO) pipeline to produce a VTO experience that simulates the target hair color with the input image to produce an output image;

wherein the VTO pipeline comprises a color refinement neural network to generate the output image combining the target hair color and the input image, the color refinement neural network comprising a generative neural network trained under guidance of a hair classification network comprising a shade classifier that outputs a hair shade value and a reflectance classifier that outputs a hair reflectance value for determining training loss information from output images for training the generative neural network.

2. The computing device of claim 1, wherein the instructions are executable by the processor to cause the computing device to provide an interface to one or both of: i) a color recommendation engine to recommend a target hair color; and ii) an e-commerce service with which to buy one or both of a product or service.

3. The computing device of claim 1, wherein the VTO pipeline comprises a color mapping network trained to produce a color map for input to the generative neural network to produce the output image for the VTO experience, the color map produced from features of the image, image hair color data determined from the image, and the target hair color.

4. The computing device of claim 3, wherein the color mapping network comprises an encoder to determine the features from the input image; a concatonator to combine the features, the target hair color and the image hair color data for processing by a first fully connected block, and a second block for processing an interim map from the first block with the image hair color data to produce the color map for input to the generative neural network.

5. The computing device of claim 4, wherein the VTO pipeline comprises a hair analysis engine for determining the image hair color data from the input image.

6. The computing device of claim 1, wherein the input image and target hair color are defined using RGB values such that the generative neural network is trained to produce an output image using particular RGB values as guided during the training by the hair classification network using hair shade values and reflectance values.

7. The computing device of claim 6, wherein the hair classification network is defined and trained according to an industry standard for hair color classification comprising a respective plurality of classes for hair shade and hair reflectance.

8. The computing device of claim 1, wherein the hair classification network comprises an encoding backbone and each of the shade classifier and the hair reflectance classifier comprises a respective linear classifier.

9. The computing device of claim 8, wherein the hair classification network having been defined through training with a sum of shade and reflectance cross entropy losses determined from i) outputs of hair shade values and hair reflectance values, and ii) target labels for hair shade and hair reflectance, the target labels prepared for hair classification network training images from respective expert votes by a plurality of experts.

10. The computing device of claim 9, wherein the target labels comprise soft labels for at least some of the training images, the soft label determined from an empirical distribution of the expert votes over the respective classes.

11. The computing device of claim 9, wherein one of a. the hair classification network having been trained with respective annotator confusion matrices comprising a plurality (n) of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together; or b. the hair classification network having been trained in accordance with a mean teacher framework.

12. A method of configuring a neural network that classifies hair shade and hair reflectance of hair in an input image, the method comprising:

providing the neural network, the neural network comprising an encoding backbone coupled to i) a shade classifier that outputs a hair shade value and ii) a reflectance classifier that outputs a hair reflectance value, each classifier comprising a linear classifier;

providing a plurality of training images associated with respective training labels for each of hair shade and hair reflectance, the target labels prepared from respective expert votes by a plurality of experts; and training the neural network using the training images, the training performed in accordance with a sum of shade and reflectance cross entropy losses determined from i) classifier outputs of the hair shade values and hair reflectance values, and ii) the target labels.

13. The method of claim 12, wherein the training comprises training the neural network using a mean teacher framework.

14. The method of claim 12, wherein the training comprises training the neural network using respective annotator confusion matrices comprising a plurality (n) of shade annotator confusion matrices and a plurality (n) of reflectance annotator confusion matrices, wherein n is defined from a total number of experts providing the expert votes, and wherein the output from the shade classifier is multiplied by a respective one of the plurality of shade confusion matrices and wherein the output from the reflectance classifier is multiplied by a respective one of the plurality of reflectance confusion matrices to predict the vote of a respective one of the plurality of experts; and wherein the neural network and respective annotator confusion matrices are trained together.

15. A method comprising:

providing a generative neural network that generates an output image combining a target hair color with an input image;

providing a hair classification network as a component of a discriminator of the generative neural network, the hair classification network comprising i) a shade classifier that determines an output hair shade and ii) a reflectance classifier that determines an output hair reflectance;

determining training loss information using the target hair color and the output hair shade, and output hair reflectance; and training the generative neural network under guidance of the hair classification network using the training loss information.

16. The method of claim 15, wherein the target hair color, input image and output image are defined using RGB type data and the output hair shade and output hair reflectance are defined in accordance with an industry standard for hair color classification comprising a respective plurality of classes for hair shade and hair reflectance.

17. The method of claim 15 comprising, prior to training the generative neural network, pre-training a color mapping network configured to process the input image and, image hair color data from hair pixels of the input image and the target hair color to provide a color map to the generative neural network for generating the output image from the input image.

* * * * *